(12) United States Patent
Thomas et al.

(10) Patent No.: US 11,606,944 B2
(45) Date of Patent: Mar. 21, 2023

(54) FISHING LINE SPOOLER

(71) Applicant: Eposeidon Outdoor Adventure, Inc., Garden City, NY (US)

(72) Inventors: Scott Thomas, Canton, GA (US); Qi Ying Dong, Guangzhou (CN)

(73) Assignee: Eposeidon Outdoor Adventure, Inc., Garden City, NY (US)

( * ) Notice: Subject to any disclaimer, the term of this patent is extended or adjusted under 35 U.S.C. 154(b) by 240 days.

(21) Appl. No.: 16/949,212

(22) Filed: Oct. 20, 2020

(65) Prior Publication Data
US 2021/0137086 A1    May 13, 2021

Related U.S. Application Data

(60) Provisional application No. 62/931,866, filed on Nov. 7, 2019.

(51) Int. Cl.
*A01K 89/01* (2006.01)
(52) U.S. Cl.
CPC ................. *A01K 89/0111* (2013.01)
(58) Field of Classification Search
CPC .................................................. A01K 89/003
See application file for complete search history.

(56) References Cited

U.S. PATENT DOCUMENTS

| | | | | |
|---|---|---|---|---|
| 3,026,059 A | * | 3/1962 | Dennler | A01K 89/003 242/593 |
| 3,950,881 A | | 4/1976 | Hays | |
| 3,951,354 A | * | 4/1976 | Bagby | A01K 89/003 242/470 |
| 4,739,946 A | * | 4/1988 | English | A01K 89/003 43/25 |
| 4,776,527 A | * | 10/1988 | Prowant | A01K 89/003 43/25 |
| 4,922,644 A | | 5/1990 | Sherbondy | |
| 4,948,064 A | | 8/1990 | Richard | |
| 5,218,779 A | | 6/1993 | Morgan et al. | |
| 5,375,788 A | * | 12/1994 | English | A01K 89/003 43/25 |
| 5,725,172 A | * | 3/1998 | Koehler | A01K 89/00 242/395 |

(Continued)

FOREIGN PATENT DOCUMENTS

| | | | | |
|---|---|---|---|---|
| DE | 202007007800 U1 | * | 9/2007 | ........... A01K 89/003 |
| WO | WO-9309667 A1 | * | 5/1993 | ........... A01K 89/003 |

*Primary Examiner* — Emmanuel M Marcelo
(74) *Attorney, Agent, or Firm* — Woodard, Emhardt, Henry, Reeves & Wagner, LLP

(57) ABSTRACT

A fishing line spooler configured to engage a shaft of a fishing rod. The fishing line spooler includes a clamp selectively securable to the shaft of the fishing rod and a mounting shaft. The mounting shaft receives a fishing line supply spool along its length. The supply spool is configured to rotate around the mounting shaft. The mounting shaft is selectively mountable to the clamp in a first orientation or a second orientation. In the first orientation, the mounting shaft is secured to the clamp parallel to the longitudinal axis of the fishing rod and feeds a spinning reel. In the second orientation, the mounting shaft is secured to the clamp perpendicular to the longitudinal axis of the fishing rod and feeds a casting reel.

20 Claims, 20 Drawing Sheets

(56) References Cited

U.S. PATENT DOCUMENTS

| | | | |
|---|---|---|---|
| 6,640,484 B1* | 11/2003 | Russow | A01K 89/003 43/25 |
| 9,220,248 B2 | 12/2015 | McCord | |
| 10,231,444 B1 | 3/2019 | Nelson | |
| 2018/0116193 A1* | 5/2018 | Rogers | A01K 89/016 |

* cited by examiner

FISHING LINE SPOOLER

CROSS-REFERENCE TO RELATED APPLICATION

This application claims the benefit of US Provisional Application No. 62/931,866 filed Nov. 7, 2019, which is hereby incorporated by reference.

FIELD OF THE DISCLOSURE

The present disclosure relates in general to fishing accessories, and specifically deals with a fishing line spooler for transferring fishing line from a fishing line spool to fishing reels.

BACKGROUND

Broadly, there are two primary types of fishing reels used on fishing rods—spinning reels and casting reels. Spinning reels have a spool of fishing line with an axis parallel to the fishing rod and the fishing line is released in coils off the open end of the reel. In contrast, a casting reel has a spool mounted with the axis perpendicular to the rod. The fishing line is released perpendicular to the reel as the reel rotates.

When fishing, it is common for fishing line to be lost or broken. It is important to have a quick and easy way to refill the fishing line on the reel. However, quite often the process of refilling the reel is time consuming and frustrating. Spools of replacement fishing line have been readily available for years. Unfortunately, the process traditionally took two people to refill the fishing rod reel. One person to hold the spool of replacement fishing line and try to maintain tension in the fishing line, and another person to wind the fishing line onto the fishing rod reel. During the process of refilling the reel, it is important to prevent tangling and twisting of the fishing line during transfer from the supply spool to the fishing rod reel. In order to avoid such issues and properly load a fishing reel, it is important to maintain constant tension during the loading process.

Various devices for transferring fishing line from a spool to a fishing pole's reel are known. It is known in some cases to use an attachable device which holds a spool of fishing line to a fishing pole, eliminating the need for a second person. Most of these devices are bulky and inefficient to use. Often these devices are only capable of refilling a spinning reel or a casting reel, but cannot refill both effectively. Lastly, many devices are not able to control the tension of the fishing line resulting in tangling, twisting and/or kinking of the fishing line during transfer.

It is desirable to have easy-to-use and efficient tools to refill a fishing reel.

Thus, there is a need for improvement in this field.

SUMMARY

The present disclosure involves fishing line spoolers which are used as a tool for holding a supply spool of new fishing line and then assisting to transfer the new fishing line to a reel mounted on a fishing rod. Broadly, there are two primary types of fishing reels on fishing rods—spinning reels and casting reels. Spinning reels have a spool with an axis parallel to the fishing rod and the fishing line is released in coils off the open end of the reel. In contrast, a casting reel has a spool mounted with the axis perpendicular to the rod. The fishing line is released perpendicular to the reel as the reel spool rotates.

The present tools can be used to transfer fishing line to either a spinning reel or a casting reel as desired. The tool includes a clamp selectively securable to a fishing rod shaft and a mounting shaft. The mounting shaft is configured to receive a supply spool along its length, the supply spool having fishing line stored thereon. The supply spool is configured to rotate around the mounting shaft. The mounting shaft is selectively securable to the clamp in a first orientation or a second orientation with the supply spool thereon. In the first orientation, the longitudinal axis of the mounting shaft is parallel to the longitudinal axis of the fishing rod shaft and configured to refill a fishing line on a spinning reel on the fishing rod shaft. In the second orientation, the longitudinal axis of the mounting shaft is perpendicular to the longitudinal axis of the fishing rod shaft and is configured to refill a fishing line on a casting reel on the fishing rod shaft Additionally disclosed is a method of using the fishing line spooler. A clamp of a fishing line spooler is secured to a fishing rod having a longitudinal axis. The clamp defines a transverse passage extending from a front side of the clamp to a rear side of the clamp for receiving the fishing rod. Next, a supply spool with fishing line stored thereon is placed on a mounting shaft. The supply spool is rotatable around the mounting shaft. The mounting shaft is securable to the clamp in a first orientation parallel to the longitudinal axis of the fishing rod or the mounting shaft is securable to the clamp in a second orientation perpendicular to the longitudinal axis of the fishing rod.

Finally, a fishing line on a spinning reel on the fishing rod is refilled while the mounting shaft is in the first orientation or a fishing line on a casting reel on the fishing rod is refilled while the mounting shaft is in the second orientation.

Further disclosed is a fishing rod rack assembly which is used as a tool to optionally hold multiple supply spools of new fishing line and multiple fishing rods. The rod rack assembly also functions as a tool to transfer fishing line to one or more reels mounted on the fishing rods.

The rack assembly includes a lower bracket and an upper bracket. Both brackets include mounts to secure the rod rack assembly to a structure. The lower bracket and upper bracket cooperate to mount one or more fishing rods offsetting the heights of adjacent reels when multiple fishing rods are stored on the rod rack assembly.

Further forms, objects, features, aspects, benefits, advantages, and embodiments of the present disclosure will become apparent from a detailed description and drawings provided herewith.

DESCRIPTION OF SELECTED EMBODIMENTS

Figure 1:
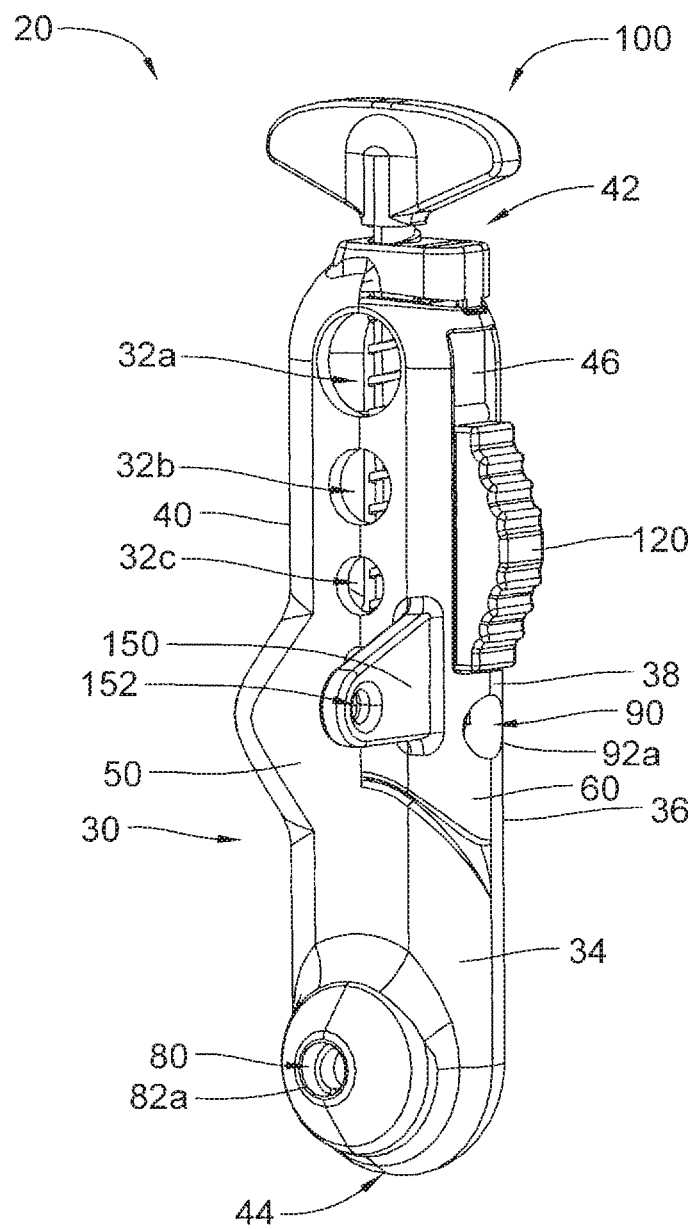
FIG. 1 is a perspective view of a representative embodiment of a line spooler according to the disclosure.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates. One embodiment of the disclosure is shown in great detail, although it will be apparent to those skilled in the relevant art that some features that are not relevant to the present disclosure may not be shown for the sake of clarity.

The present disclosure involves fishing line spoolers which are used as tools for holding a supply spool of new fishing line and then assisting to transfer the new fishing line to a reel mounted on a fishing rod. Broadly, there are two primary types of fishing reels on fishing rods—spinning reels and casting reels. Spinning reels have a spool with an axis parallel to the fishing rod and the fishing line is released in coils off the open end of the reel. In contrast, a casting reel has a spool mounted with the axis perpendicular to the rod. The fishing line is released perpendicular to the reel as the reel rotates.

The present tools can be used to transfer fishing line to either type of reel as desired. The fishing line spooler 20 may include a clamp 30 selectively securable to a fishing rod having a longitudinal axis. The tool further includes a mounting shaft 100, for example a shaft with a thumb screw grip. The clamp 30 can be mounted to a fishing rod 200 in a position convenient for refilling a casting reel 210 or a spinning reel 220 mounted to the fishing rod 200. The mounting shaft 100 is selectively securable to clamp 30 in a first orientation or a second orientation. As described in detail below, while in the first orientation, the fishing line spooler 20 is configured to refill a fishing line on a spinning reel, and, while in the second orientation, the fishing line spooler is configured to refill a fishing line on a casting reel. Optionally, the tool can include a tensioning element 110 such as an elastic band.

Figure 2:
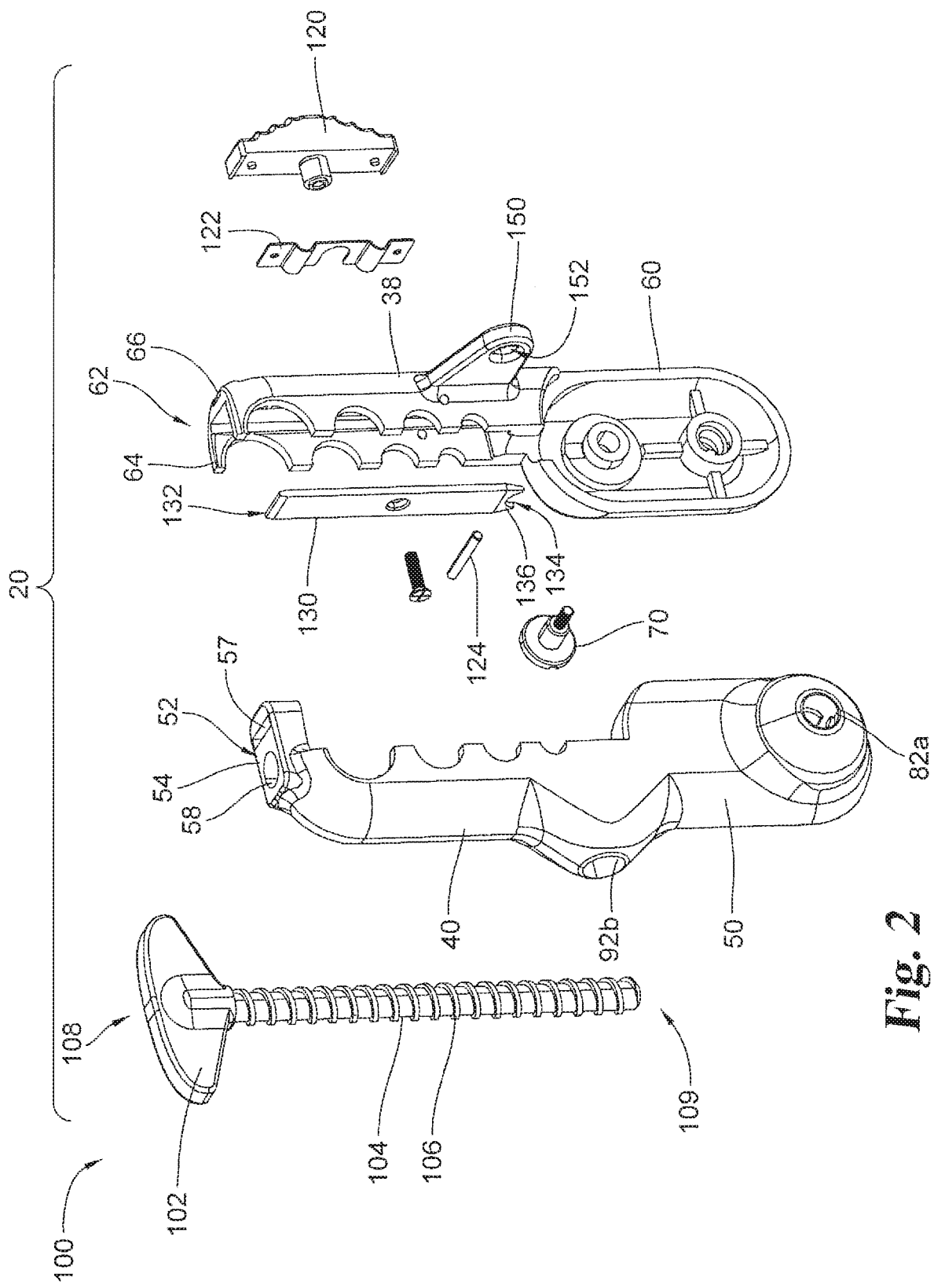
FIG. 2 is an exploded perspective view of the line spooler of FIG. 1.
Figure 3:
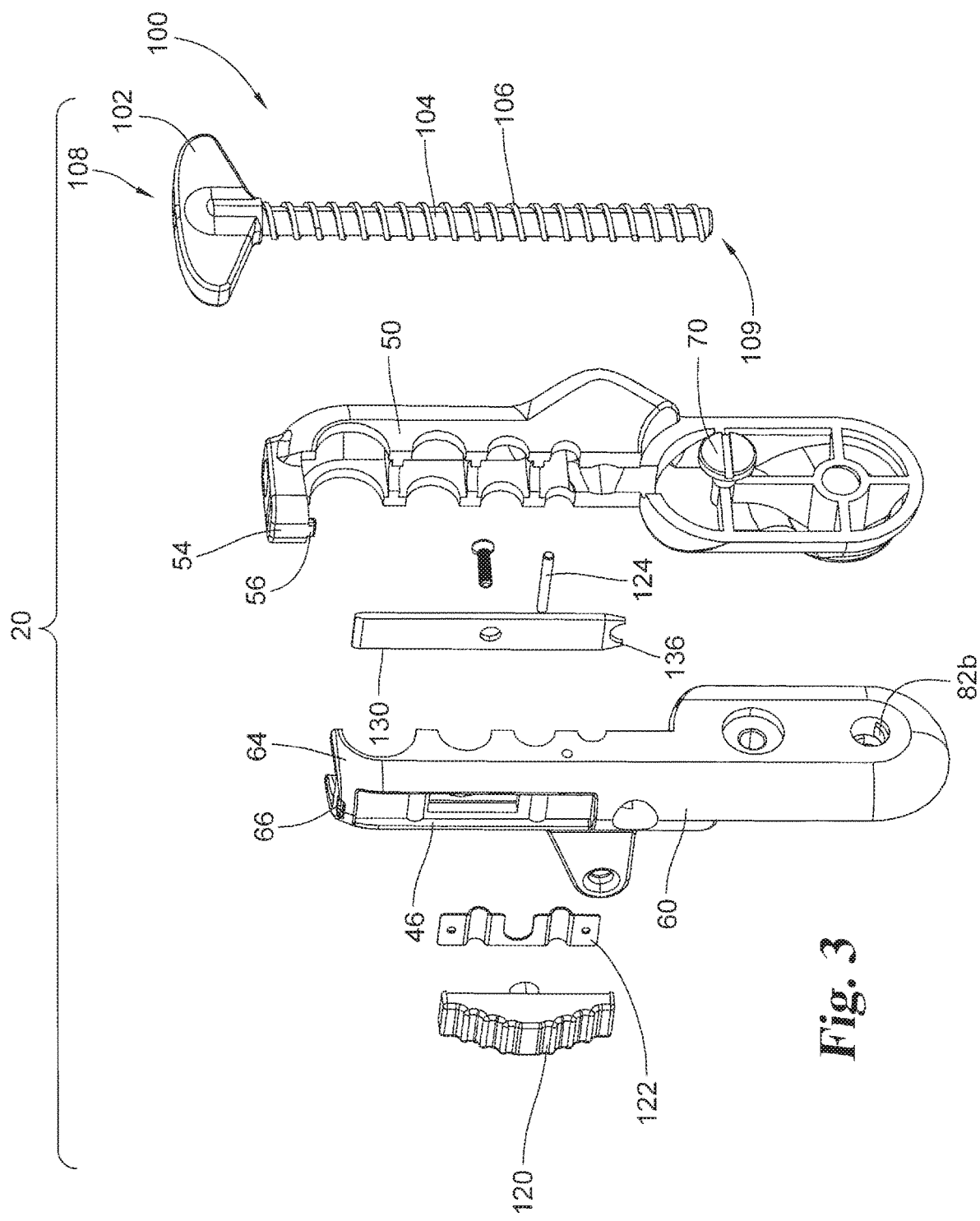
FIG. 3 is another exploded perspective view of the line spooler of FIG. 1.

FIGS. 1-3 illustrate the fishing line spooler 20 shown in perspective and two exploded views. The clamp 30 may include a first clamp half 50 and a second clamp half 60 hinged together. The first and second clamp halves 50, 60 are selectively movable between either an open position or a closed position. The clamp halves 50, 60 may pivot/rotate around an axle 70 between the open position and the closed positions. The clamp 30 may be made of any acceptable material, for example any metal, plastic or a combination of the two. Often, a plastic with a low density may be desired so that the line spooler will float if dropped in the water.

In the closed position, the first and second clamp halves 50, 60 cooperate to define a series of transverse circular passages 32a, 32b, 32c of different diameters. The transverse circular passages 32a, 32b, 32c extend from the front to the rear of the clamp. The passages 32a, 32b, 32c may be configured to receive a fishing rod. The different diameters allow a single version of the fishing line spooler 20 to be compatible with fishing rods of various outer diameters. The transverse circular passages 32a, 32b, 32c may extend parallel relative to each other. Each opening defining the transverse circular passages may optionally have a rubber overmolded insert to provide better grip strength and to help prevent damage to the rod. In one embodiment, the clamp 30 may include three transverse circular passages. In other embodiments, any reasonably desired number of transverse circular passages may be provided by the clamp 30. Regardless of the number of passages, the transverse circular passages may be located through the top half of the clamp. The clamp halves 50, 60 can be placed around the fishing rod 200 with the fishing rod 200 aligned within one of the passages 32a, 32b, 32c. The clamp 30 is then closed to secure the clamp 30 onto the fishing rod 200.

In an alternative embodiment, the transverse circular passages may be located entirely through either the first clamp half or the second clamp half. In yet another embodiment, the clamp may be a single piece. In this embodiment, the clamp may be composed of a single clamp piece with transverse passages extending through the clamp. In certain alternative embodiments, the fishing rod could be linearly inserted into one opening of a transverse passage and advanced through the passage until the fishing rod exits through the opening on the opposite side of the clamp with the clamp then being secured in place on the rod.

In another embodiment, the transverse passages may be lateral openings in a single clamp piece. The passages may be circular or may form a tapered "V" shape. This configuration may allow the fishing rod to be placed in the openings without a clamp that closes around it.

The clamp 30 may define a spinning reel passage 80. The spinning reel passage 80 may extend parallel to the fishing rod 200. The spinning reel passage 80 is defined by an opening 82a on front side 34 of fishing line spooler 20 and an opening 82b on rear side 36 of the line spooler 20. The spinning reel passage's diameter is slightly larger than the diameter of the mounting shaft 100. This allows the mounting shaft 100 to advance within and retract out of the spinning reel passage 80. The spinning reel passage 80 may include threads to engage the mounting shaft 100. In another embodiment, the openings 82a, 82b may be free of threads. In some embodiments, the mounting shaft 100 may be secured in place in the passage by a spring clip collar or fastener, such as a nut or clamp, placed around the end of intermediate portion 104 protruding from the opening 82b of the spinning reel passage 80 on the rear side of the clamp 30. Mounting shaft 100 may be secured by any means described in the disclosure below.

The clamp 30 also defines a casting reel passage 90. In this embodiment, the casting reel passage and the spinning reel passage are different passages. The casting reel passage 90 may extend perpendicular to the fishing rod 200. The casting reel passage 90 may be defined by an opening 92a on a first side 38 of the clamp 30 and an opening 92b on a second side 40 of the clamp 30. The casting reel passage's diameter is slightly larger than the diameter of the mounting shaft 100. This allows the mounting shaft 100 to advance within and retract out of the casting reel passage 90. The casting reel passage 90 openings 92a, 92b may be smooth and free of threads. If casting reel passage 90 and openings 92a, 92b are free of threads, the mounting shaft 100 may be secured by a spring clip collar or fastener placed around the end of the intermediate portion 104 protruding from opening 92b of the casting reel passage 90. As an alternative, threads could be included to engage with helical threads 106 of the mounting shaft's 100 intermediate portion 104. As described in further detail below, any of these alternatives may include a sliding lever mechanism to secure the mounting shaft 100.

In certain embodiments, the clamp 30 can include a guide tab 150 for facilitating transfer of fishing line to the fishing rod spinning reel 220 by acting as a line guide. The guide tab 150 may be offset from the spinning reel passage 80 extending toward spinning reel 220 on the fishing rod 200. The guide tab 150 may include an aperture 152. Guide tab 150 may further include an insert within the aperture 152 to prevent a fishing line from wearing a groove in the guide tab. The insert additionally helps avoid damage to the fishing line. Fishing line from the supply spool 180 can be fed through the aperture 152 to change the direction of the fishing line and then to the spinning reel 220.

As seen in detail in FIGS. 2 and 3, the clamp 30 may incorporate a sliding lever mechanism to secure or help secure the mounting shaft 100 in place. The sliding lever includes a thumb bar 120, a spring 122, a guide pin 124 and a forked plate 130. The forked plate 130 inside clamp 30 is secured to the thumb bar 120 on the exterior. The thumb bar 120 and forked plate 130 may be slid upward and downward together, causing the forked plate 130 to engage or disengage intermediate portion 104 of the mounting shaft 100 when it is in place through the casting reel passage 90. The spring 122 engages the thumb bar 120 and is located in a groove 46 of the clamp 30. The guide pin 124 may be used to help align the forked plate 130 and prevents the forked plate 130 from wobbling during use.

The forked plate 130 includes a top end 132 and a bottom end 134. The bottom end 134 defines a forked portion 136. The forked portion 136 is configured to engage with intermediate portion 104 of the mounting shaft 100 in order to selectively hold the mounting shaft 100 in place. In the illustrated embodiment, the forked portion 136 includes a curved portion matching the curvature of the shaft's diameter. Further, the top end 132 of the forked plate 130 may slideably engage with the clamp 30. The top end 132 may be positioned in a rectangular slot 57 of the first clamp half 50. In this position, top end 132 assists in holding the clamp halves 50, 60 in the closed position. The forked plate 130 may be made of any appropriate material, for example any metal or plastic.

The clamp 30 may include a latching mechanism. The top end 52 of the first clamp half 50 includes a latching portion 54, and the top end 62 of the second clamp half 60 includes a receiving portion 64. The latching portion 54 may include a locking tab 56 molded into the clamp 30. The locking tab 56 can be a small protrusion on the outer end of the latching portion 54. The receiving portion 64 may include a receiving slot 66 molded into the clamp to receive the locking tab 56. In the closed position, the latching portion 54 and receiving portion 64 overlap to hold the clamp 30 closed.

Further, the clamp 30 may include a top end 42 and a bottom end 44. The top end 42 of the clamp 30 can include an opening 58 with an orientation different from the orientation of the casting reel passage and the orientation of the spinning reel passage. When not in use, the mounting shaft 100 can be stored by placing it through the opening 58 in the top end 42 of the clamp 30 so that a majority of the length of the intermediate portion 104 extends within an interior volume of the clamp 30. Advantageously, this allows for a compact storage configuration that is easily placed within a typical fisherman's tackle box.

As illustrated in FIGS. 2 and 3, the mounting shaft 100 includes a top end 108 for gripping and a bottom end 109 for mounting. The top end 108 optionally includes a thumb screw type handle 102. Extending from the handle 102 is a length/intermediate portion 104. The intermediate portion 104 may be cylindrical. Further, the intermediate portion 104 may include helical threads 106 along at least a portion of the length. The mounting shaft 100 is configured to receive the supply spool 180 along its intermediate portion 104, the supply spool 180 having fishing line stored thereon. The supply spool 180 is configured to rotate around the mounting shaft 100. The mounting shaft 100 may be injection molded plastic, metal or any combination of the two, including a plastic handle and metal shaft or a metal handle and plastic shaft.

Figure 4:
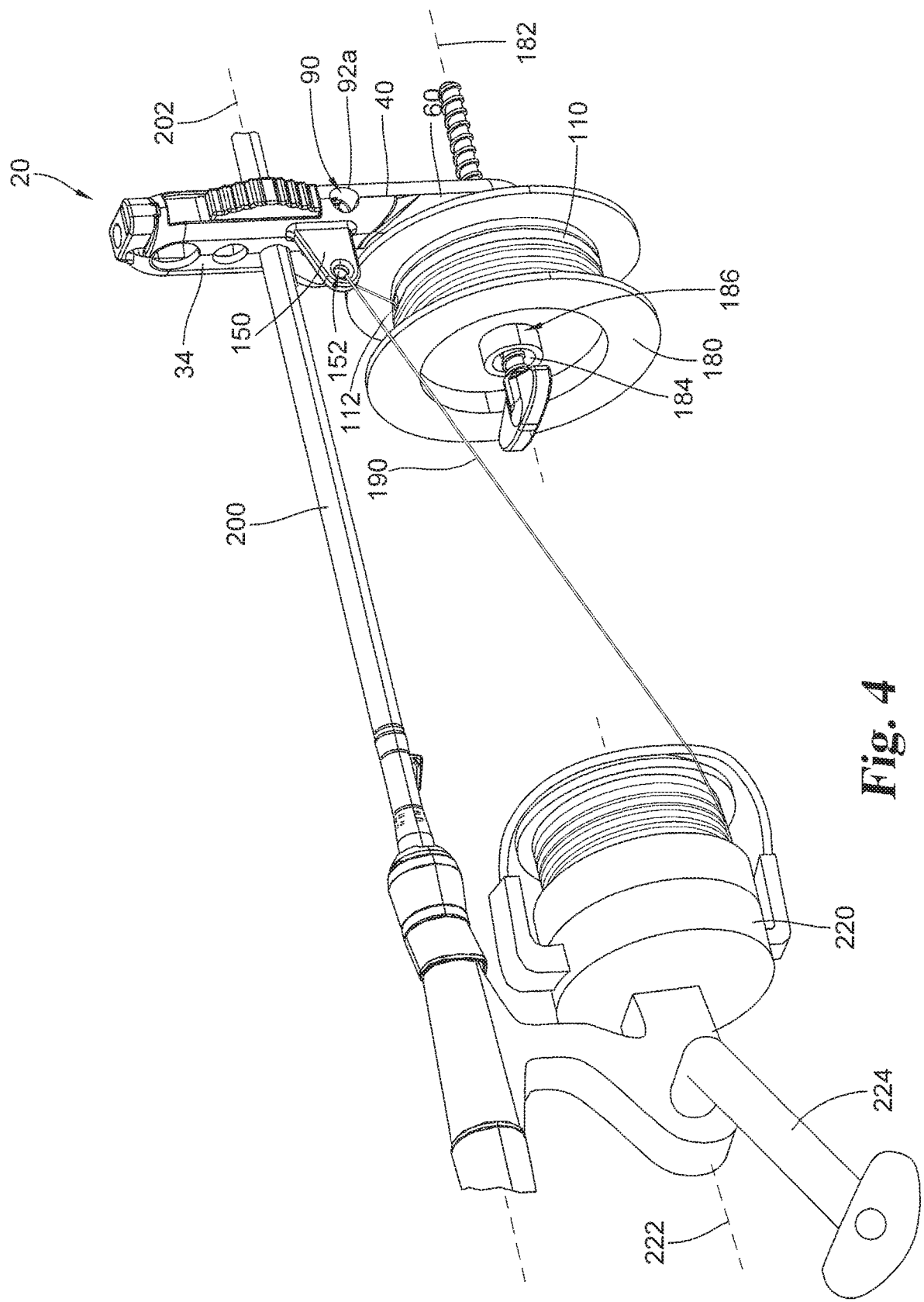
FIG. 4 is a perspective view of the line spooler of FIG. 1 holding a supply spool and engaging a fishing rod with a spinning reel.
Figure 5:
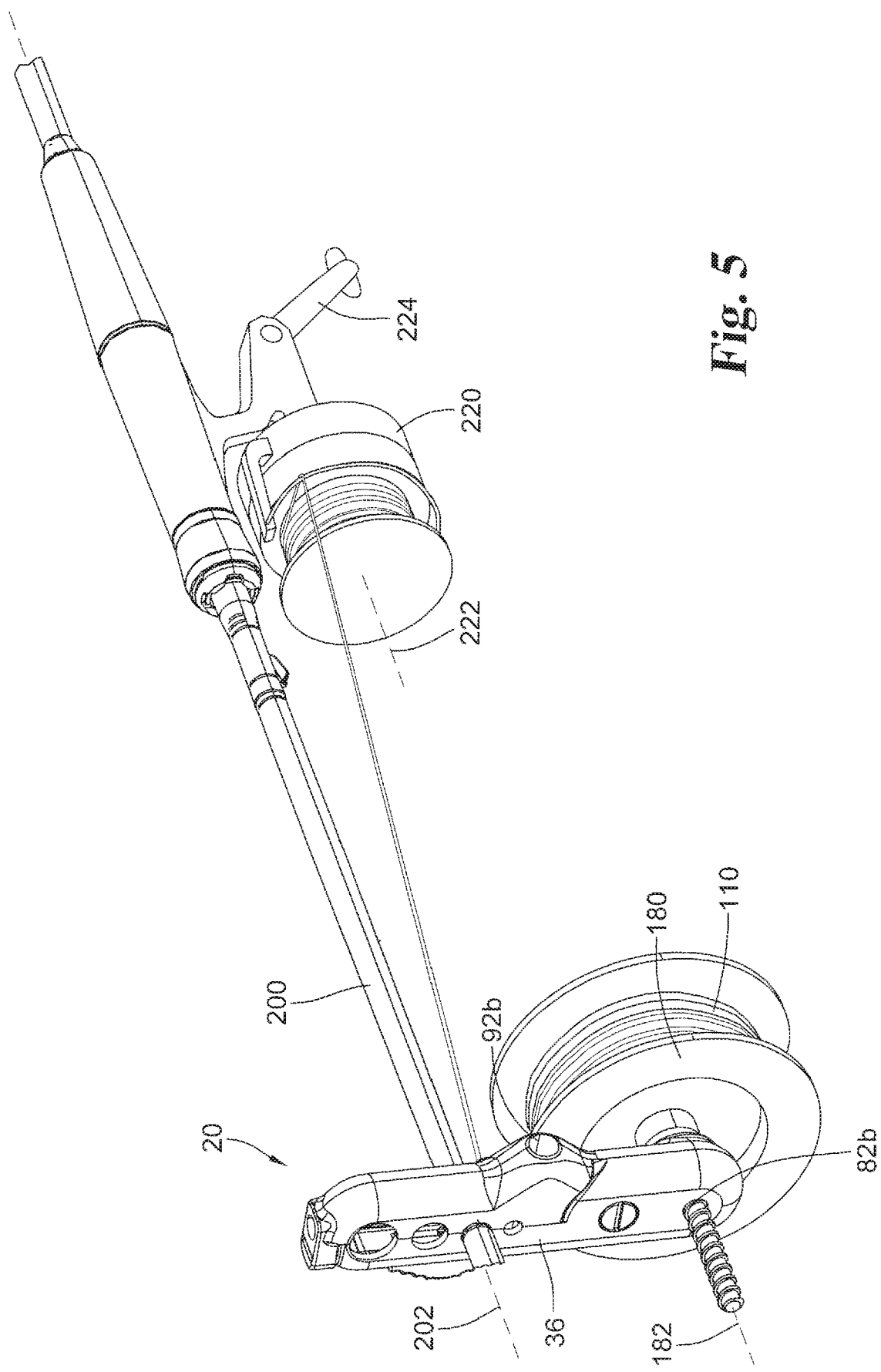
FIG. 5 is another perspective view of the line spooler of FIG. 1 holding a supply spool and engaging a fishing rod with a spinning reel.

As illustrated in FIGS. 4 and 5, the fishing line spooler 20 may be used to refill a spinning reel 220. When feeding a spinning reel 220, the supply spool 180 is mounted with its longitudinal axis 182 parallel to longitudinal axis 202 of the fishing rod 200 and parallel to a spinning reel axis 222. The supply spool 180 may include a hub 184 defining a supply spool passage 186. The mounting shaft 100 may pass through the supply spool passage 186 and then may extend through the opening 82a of the spinning reel passage 80 in the front side 34 of the spooler 20. The intermediate portion 104 of the mounting shaft 100 may extend through the spool 180 and the spinning reel passage 80 and then exits through opening 82b in the rear side 36 of the spooler 20. The mounting shaft 100 may threadably engage with either or both of openings 82a, 82b in the front side 34 or the rear side 36 of the clamp 30. In one alternative, the openings 82a, 82b in the clamp 30 do not threadably engage the mounting shaft 100.

FIGS. 4 and 5 further illustrate the optional self-adjusting tensioning element 110. The tensioning element 110 is configured to extend around the fishing line on the supply spool 180. The tensioning element 110 may be a loop of material with a high elasticity to allow it to expand over fishing line 190 on supply spool 180, for example an elastic band. The tensioning element 110 may include an opening/eyelet 112. The tensioning element 110 assists in maintaining consistent tension on fishing line 190 on supply spool 180, assisting in feeding fishing line 190 seamlessly to either type of fishing rod reel during a refill process.

During use, the tensioning element 110 is placed around the supply spool 180 with a feed end of the fishing line 190 fed through the eyelet 112 as the fishing line leaves the supply spool. To feed spinning reel 220, the fishing line 190 is then fed through the guide tab 150 on clamp 30, and then extends to the bail and spinning reel 220. Utilizing the guide tab 150 helps maintain tension and a consistent twist in order to avoid tangling, inappropriate twisting or kinking of the fishing line 190 during the refilling process of the fishing rod reel.

As the spool size decreases during use, the tensioning element 110 is able to self-adjust so that the tension is maintained on the fishing line 190. Due to its elasticity, the tensioning element 110 may automatically adjust its size to a certain extent. The tensioning element 110 size may also be manually adjusted, for example with an adjustable strap, by the user of the fishing line spooler to ensure that an appropriate amount of tension is provided on the fishing line 190.

The tensioning element 110 does not rotate while the fishing line 190 on the supply spool 180 is transferred. Instead it is stationary while providing tension to the spool of fishing line 190. As line is transferred, the supply spool 180 rotates within the non-rotating tensioning element 110. The tensioning element 110 helps keep stray fishing line from bulging or tangling on the supply spool 180.

In a spinning reel 220, it is important that the fishing line 190 maintains a consistent "twist", for example in a clockwise or counter-clockwise arrangement as the line is coiled onto the spinning reel 220. The present arrangement helps maintain the preexisting line twist when transferring fishing line 190 from a supply spool 180 to a spinning reel 220. During the refill process, a spinning reel handle 224 is cranked to pull and transfer fishing line 190 from the supply spool 180 to wind around the spinning reel 220.

Figure 6:
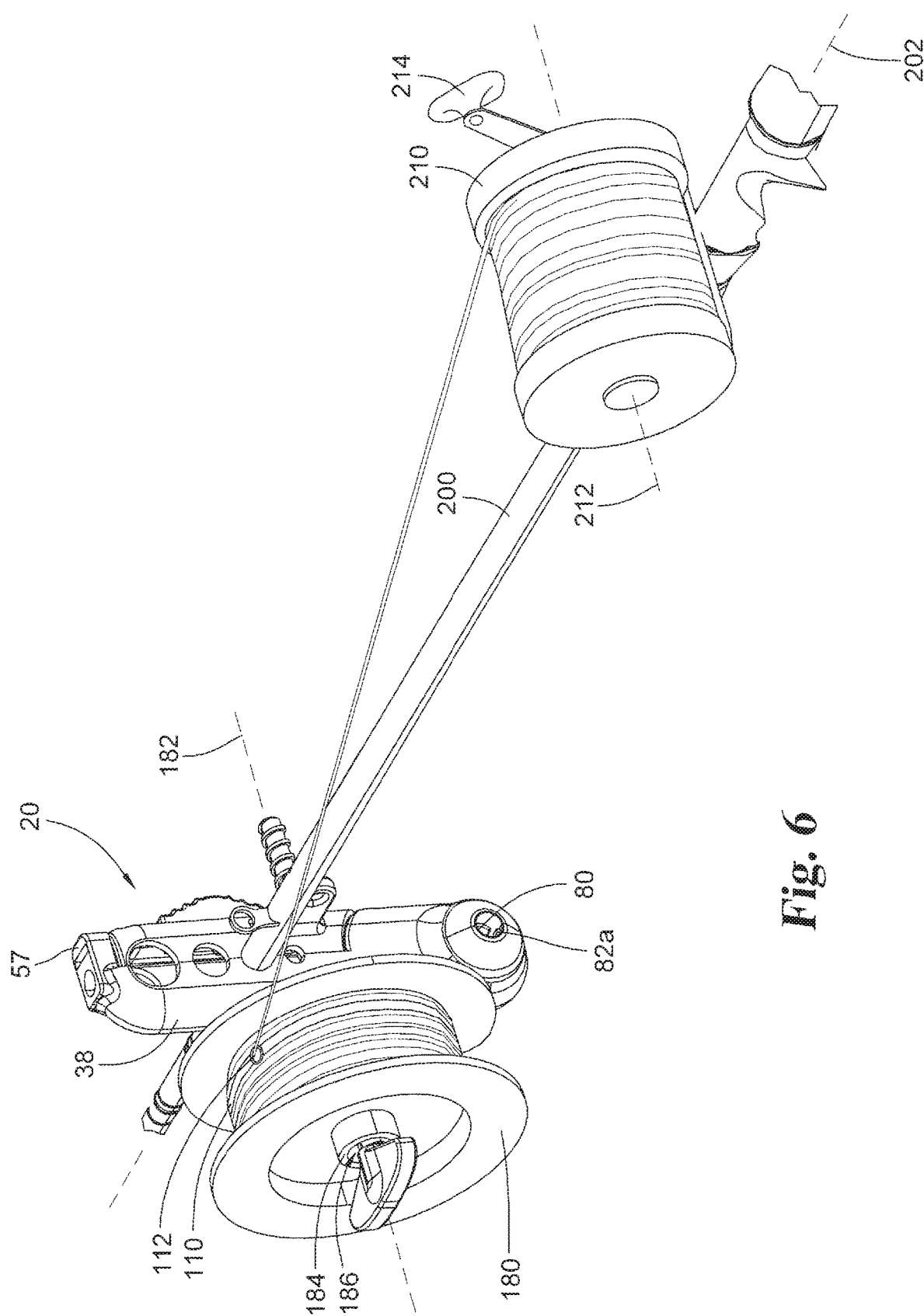
FIG. 6 is a perspective view of the line spooler of FIG. 1 holding a supply spool and engaging a fishing rod with a casting reel.
Figure 7:
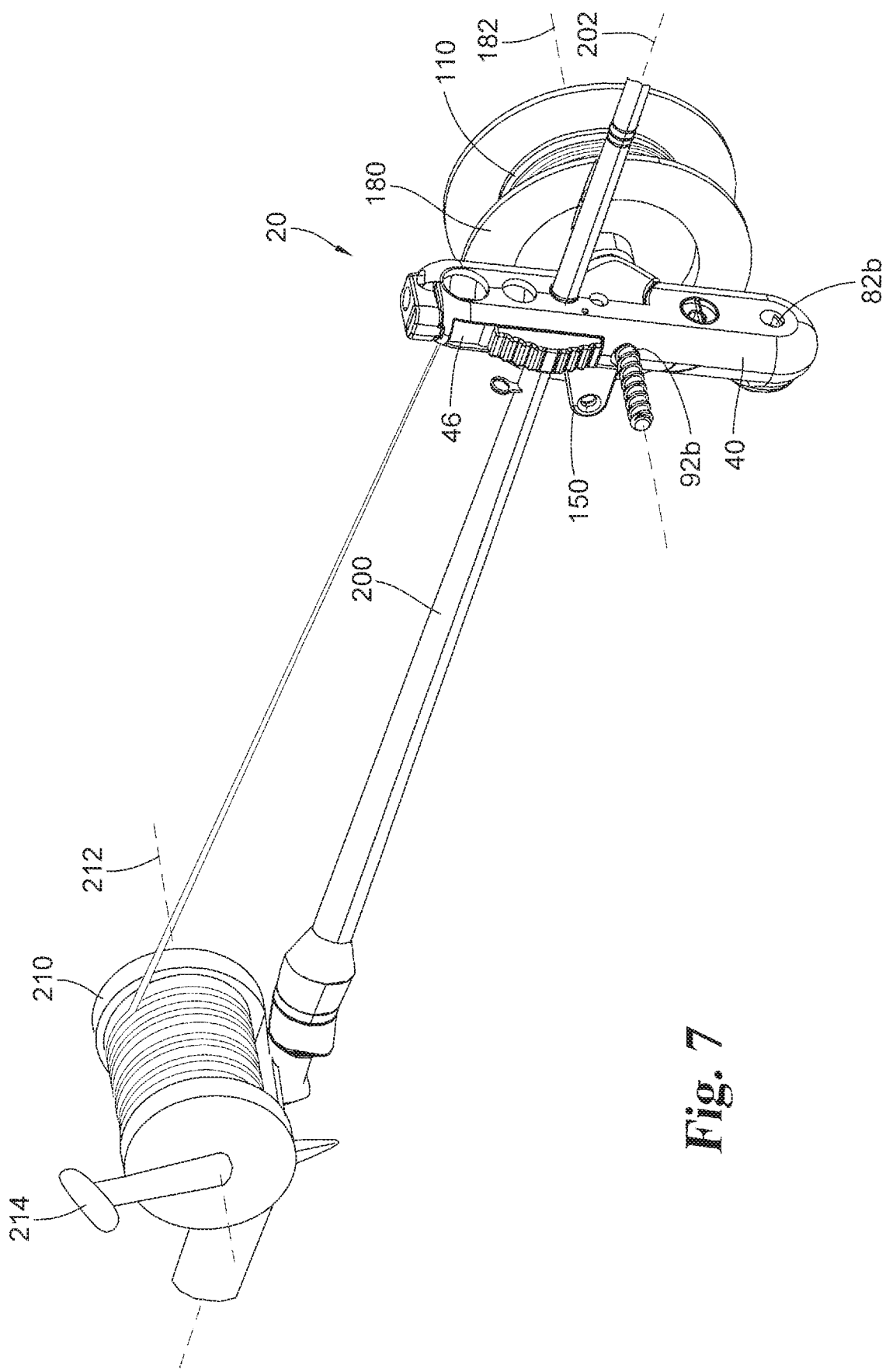
FIG. 7 is another perspective view of the line spooler of FIG. 1 holding a supply spool and engaging a fishing rod with a casting reel.

FIGS. 6 and 7 illustrate the fishing line spooler 20 and supply spool 180 configured to transfer fishing line 190 to casting reel 210. When feeding casting reel 210, the supply spool 180 is mounted to the fishing line spooler 20 with the mounting shaft 100 in an orientation such that supply spool axis 182 is perpendicular to the longitudinal axis 202 of the rod and parallel to the casting reel axis 212. The supply spool 180 may include hub 184 defining a supply spool passage 186. The mounting shaft 100 may pass through the supply spool passage 186 and enters an opening 92a of the casting reel passage 90 in the first side 38 of the clamp 30.

Depending on the width of the supply spool 180, intermediate portion 104 of the mounting shaft 100 may extend through the casting reel passage 90 and protrude from opening 92b in the second side 40 of the clamp 30. During the refill process, a casting reel handle 214 is cranked to pull and transfer fishing line 190 from the supply spool 180 to wind around the casting reel 210.

Figure 8:
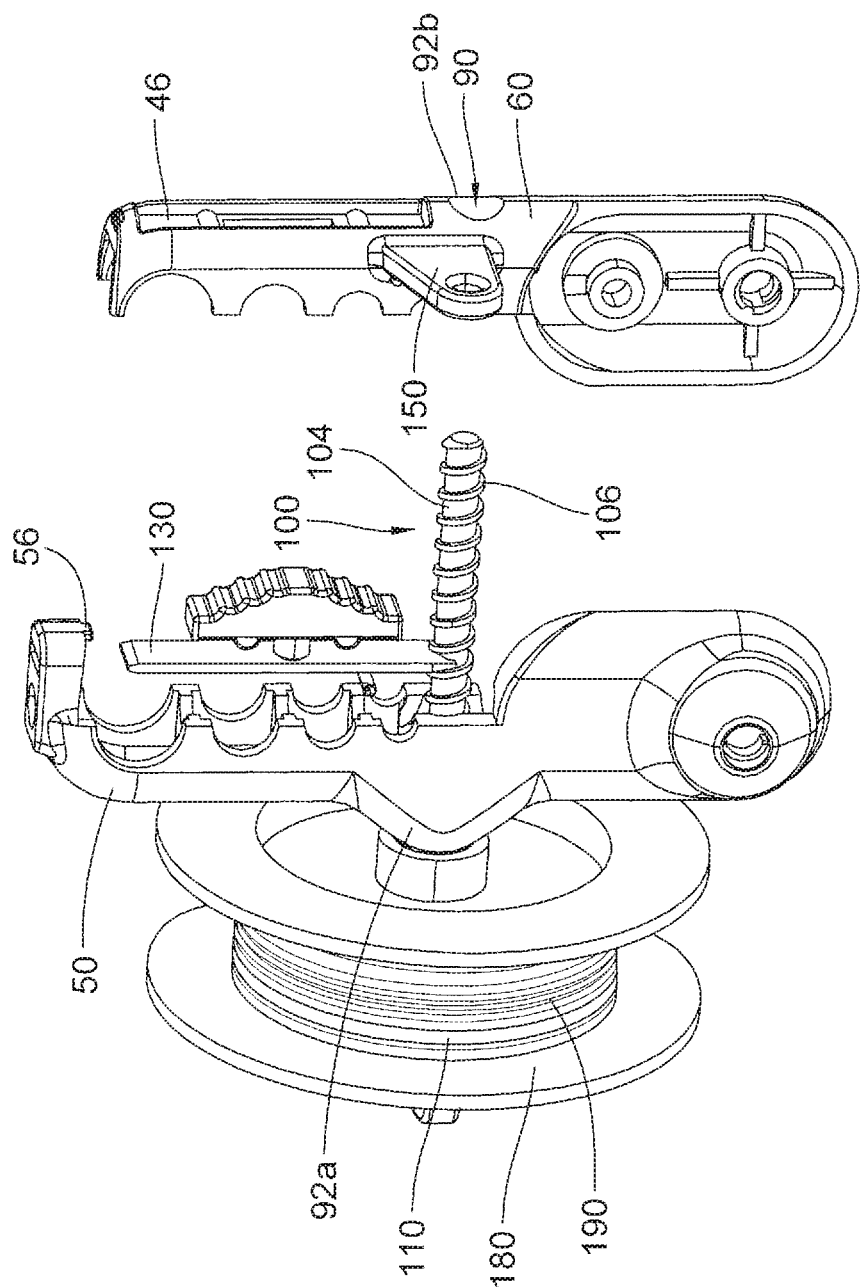
FIG. 8 is a partially exploded perspective view of the line spooler of FIG. 1 with a supply spool.
Figure 13:
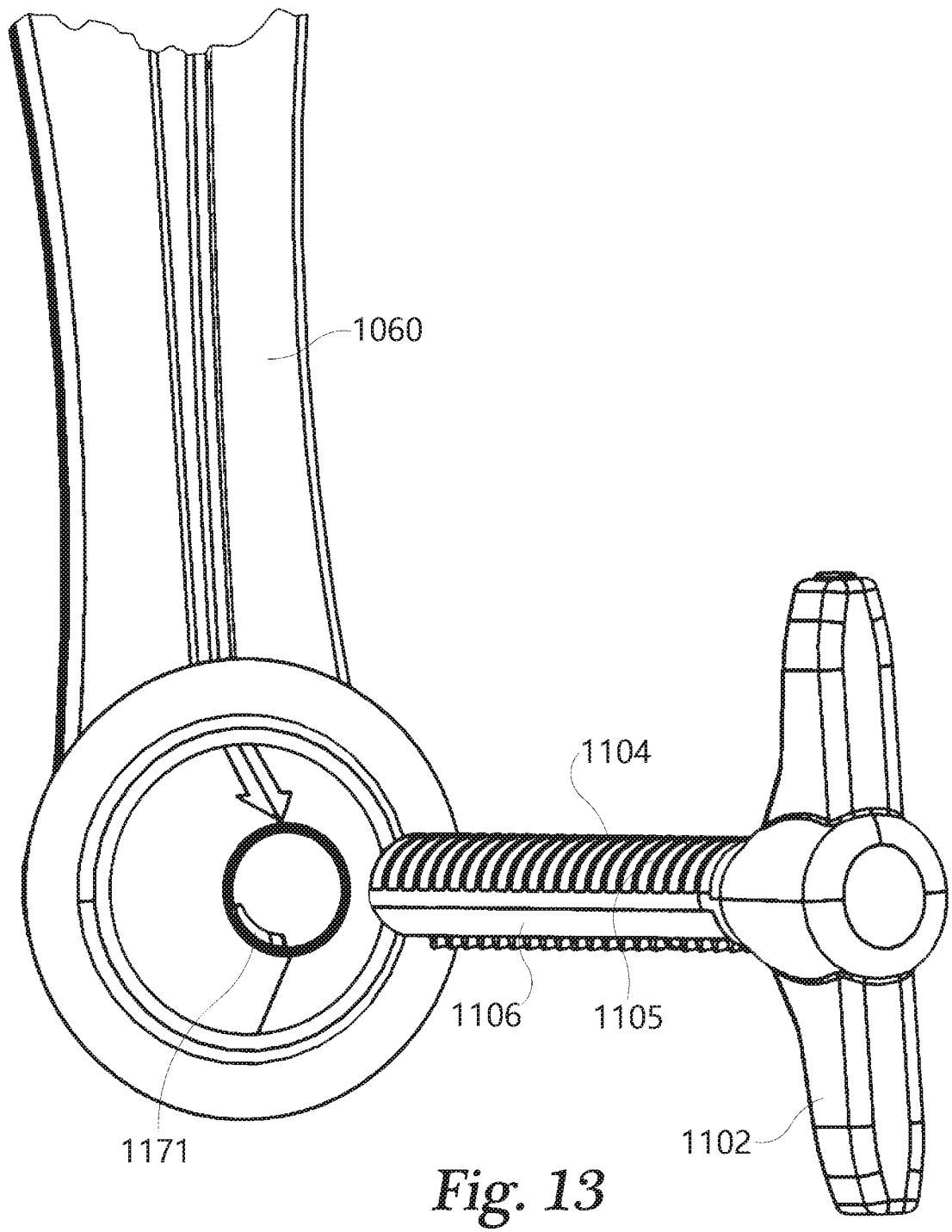
FIG. 13 is a partially cross-sectional, exploded view of the line spooler of FIG. 9 of a spacing shaft, a supply spool and a mounting shaft

As illustrated in the semi-exploded view of FIG. 8, in certain embodiments, the fishing line spooler 20 may utilize a sliding lever allowing for a "quick change" of the supply spool 180 during the refill of a fishing reel. For example, the mounting shaft 100 may not threadably engage the casting reel passage's openings 92a, 92b in the clamp 30. Instead, intermediate portion 104 of the mounting shaft 100 may be grasped by the forked plate 130 which may be slid downward using the sliding lever to engage intermediate portion 104 and upward to disengage from intermediate portion 104. Once the mounting shaft 100 is released by the sliding lever, the user may remove the mounting shaft 100 from the casting reel passage 90 by pulling the mounting shaft 100 in a linear direction without needing to rotate the mounting shaft 100. This is enabled due to the diameter of the passage being larger than the diameter of the intermediate portion 104. The user may then remove the supply spool 180 from the mounting shaft 100 and reinsert the mounting shaft 100 through a new supply spool. The mounting shaft 100 may then be reinserted through the casting reel passage 90 in a linear direction without needing to rotate the mounting shaft 100. This eliminates the time-consuming need to thread or unthread the mounting shaft 100 through the clamp 30. It is understood that the steps in the "quick change" process may be made simultaneously or in a step by step process. It should be understood that the same mounting method may be used when utilizing the spinning reel passage 80 to refill a spinning reel 220. Optionally, the mounting shaft 100 may include a quick release mechanism as illustrated in FIG. 13 and discussed below.

The supply spool 180 may freely spin on the mounting shaft 100 although the intermediate portion 104 may apply some clamping force to create drag. While refilling a casting reel 210, line tension is maintained using the tensioning element 110 as described above. In this arrangement, the fishing line 190 feeds perpendicular to the supply spool 180 and onto the casting reel 210.

A technique for refilling a fishing reel with the line spooler will now be described. The user first places the fishing rod within a transverse aperture of the line spooler. The two clamp halves are then closed or otherwise oriented to grasp the fishing rod. Depending on the fishing reel type being refilled, the mounting shaft is placed through a supply spool and advanced into the clamp through either the spinning reel passage or the casting reel passage. The mounting shaft is secured to the clamp using any of the methods described above. When used, the tensioning element with an eyelet is secured over the fishing line on the supply spool and a feed end of the fishing line is threaded through the eyelet. Next, the fishing line is either passed through the guide tab and secured to a spinning reel or directly secured to a casting reel. The fishing rod's reel handle is then cranked to pull fishing line from the supply spool to the reel.

Once the desired amount of fishing line is transferred to the fishing rod reel, the line between the supply spool and the fishing rod reel is cut. After transfer is complete and the line has been cut, the mounting shaft may be removed from the clamp. Once the mounting shaft has been removed, the clamp may be opened and removed from the rod. Then, for storage, the clamp is returned to the closed position and the mounting shaft is inserted into the opening on the top side of the closed clamp for storage. The tool may be stored in a tackle box or any suitable storage container. Applicant does not intend to limit themselves to the recited sequence of the technique described herein. It should be appreciated that several of the steps may be done in various orders.

Figure 9:
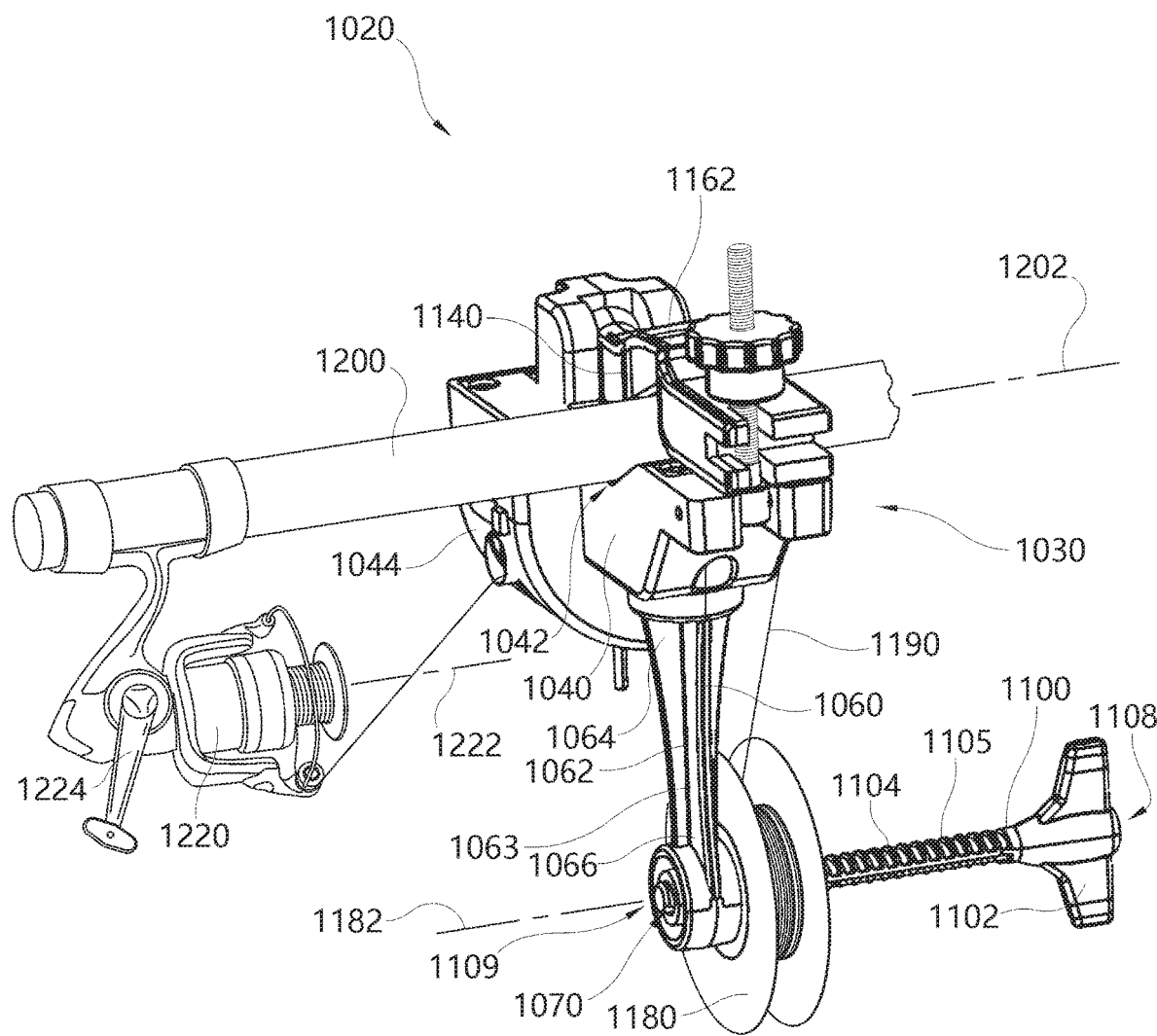
FIG. 9 is a perspective view of another embodiment of a line spooler configured to refill a spinning reel according to the disclosure.
Figure 10:
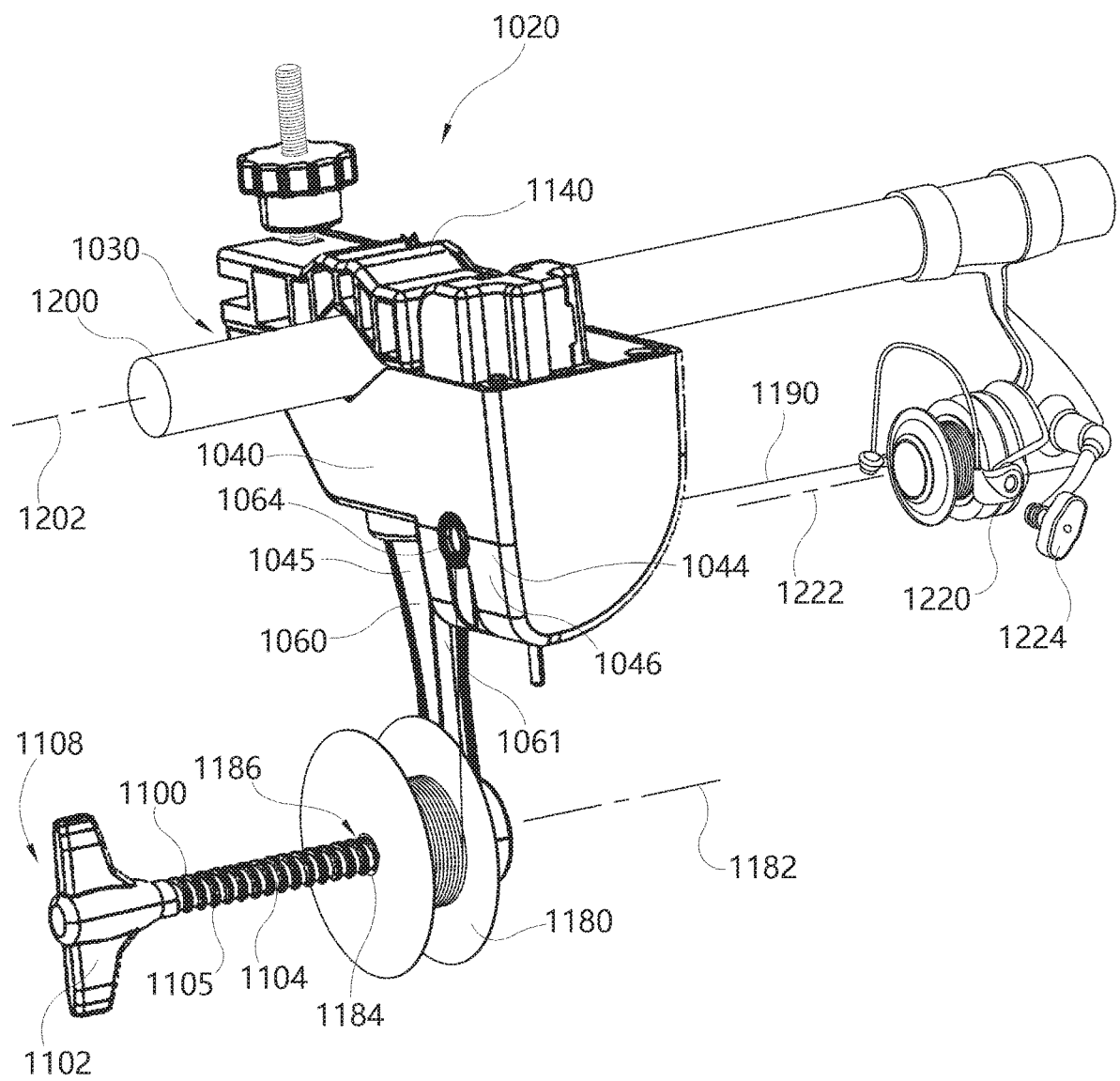
FIG. 10 is an alternative perspective view of the line spooler of FIG. 9 configured to refill a spinning reel.
Figure 11:
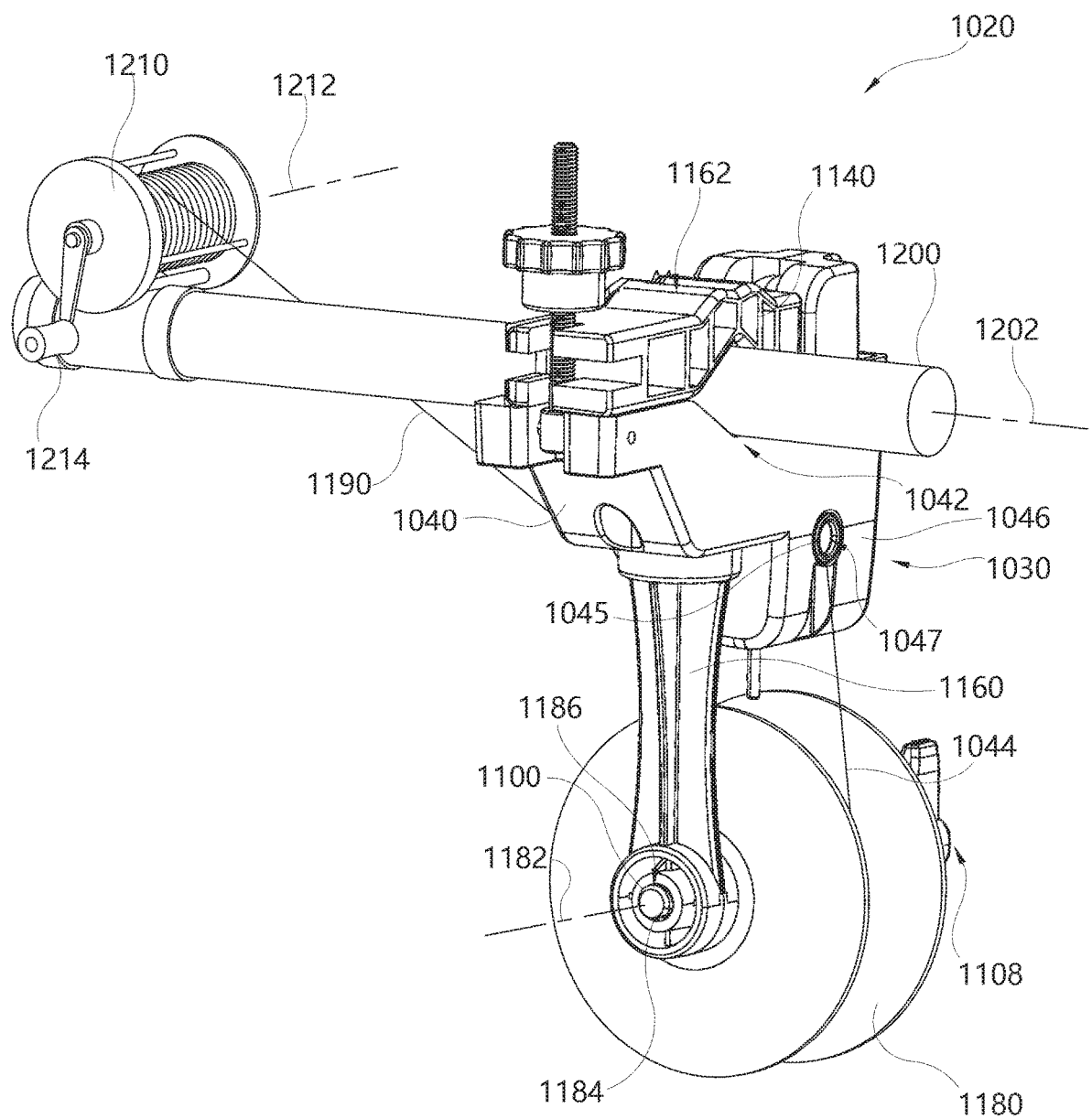
FIG. 11 is a perspective view of the line spooler of FIG. 9 configured to refill a casting reel.
Figure 12:
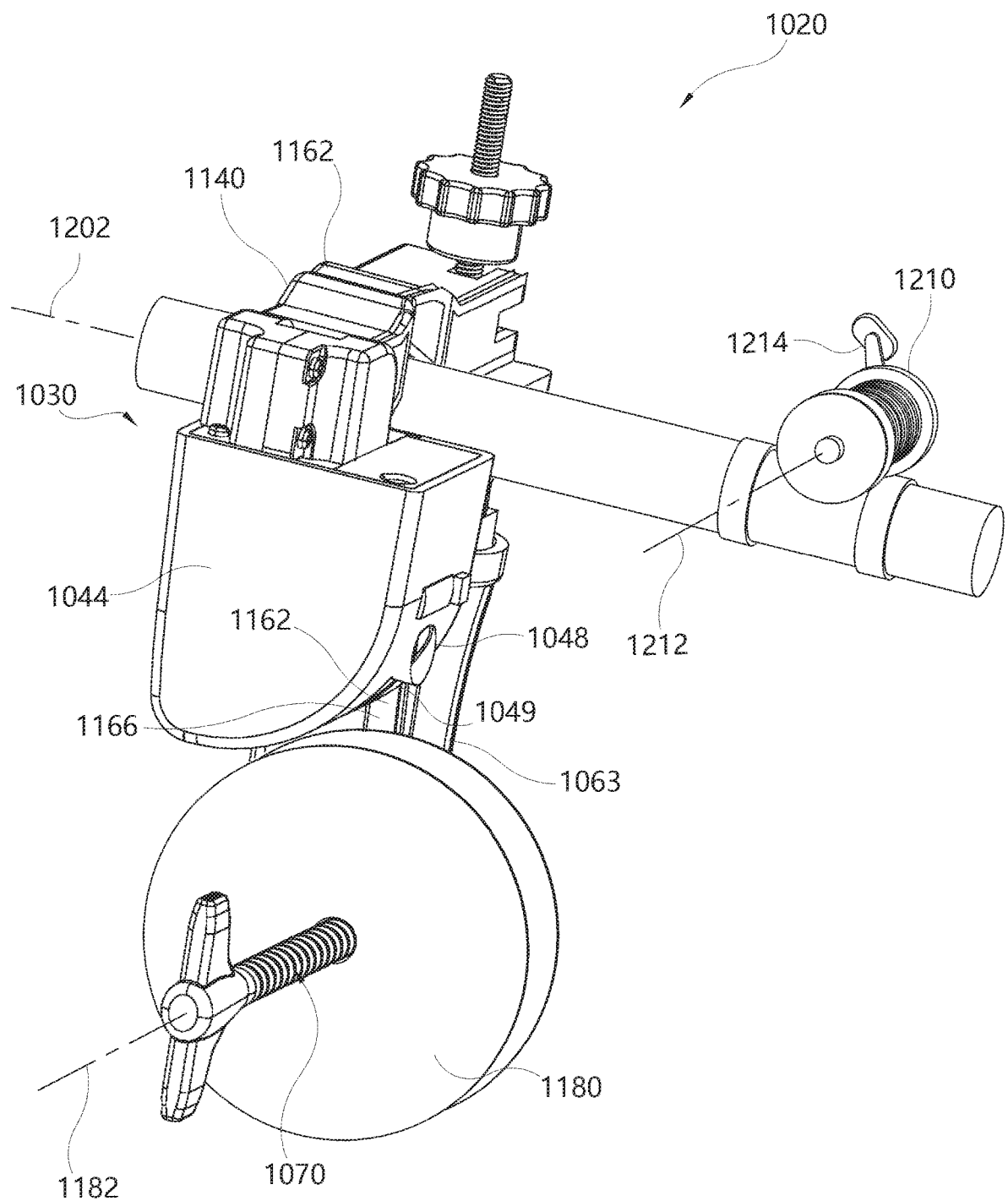
FIG. 12 is an alternative perspective view of the line spooler of FIG. 9 configured to refill a casting reel.

Representatively illustrated in FIGS. 9-12 is an alternate embodiment of a fishing line spooler tool mounted on a fishing rod. For the ease of illustration, the proportions are not to scale. Fishing line spooler 1020 is illustrated in a configuration to transfer fishing line to a spinning reel (FIG. 9 and FIG. 10) or a casting reel (FIG. 11 and FIG. 12). Fishing line spooler 1020 is comparable to fishing line spooler 20. For example, fishing line spooler 1020 may include tensioning element 110 (not illustrated with fishing line spooler 1020) as described above, however, for the sake of brevity the tensioning element 110 will not be described again. Therefore, the applicable discussion above is incorporated herein. The differences between fishing line spooler 1020 and fishing line spooler 20 are discussed below in reference to fishing line spooler 1020.

FIGS. 9-12 illustrate prospective views of fishing line spooler 1020 configured to transfer fishing line to a spinning reel 1220 or a casting reel 1210. As illustrated fishing line spooler 1020 includes a clamp 1030 selectively securable to a fishing rod shaft having a longitudinal axis and a mounting shaft 1100.

Clamp 1030 includes a clamp body 1040 and a clamp top 1140. Clamp 1030 also includes a spacing shaft 1060. Clamp body 1040 defines a passage 1042 (see FIG. 14) for receiving a fishing rod 1200. Clamp body 1040 optionally includes a line counter 1044 integrated into clamp body 1040. In alternative embodiments, the line counter 1044 may be a separate component that is secured to the clamp body 1040, for example with fasteners. As discussed in more detail below, clamp top 1140 cooperates with clamp body 1040 to secure fishing line spooler 1020 to a fishing rod 1200. As discussed in further detail below, clamp top 1140 may include a U-shaped recess 1160 that may cooperate with the clamp body 1040 to define passage 1042.

Spacing shaft 1060 includes an elongated body 1062 with a proximal end 1064 secured to the clamp body and a distal end 1066 spaced away from the clamp body. The distal end 1066 of spacing shaft 1060 includes a spacing shaft passage 1070 for receiving mounting shaft 1100. In the illustrated embodiments, passage 1070 is circular to correspond to mounting shaft 1100. Passage 1070 extends from a front side opening of spacing shaft 1060 to a rear side opening of spacing shaft 1060. As discussed below, spacing shaft 1060 is capable of being selectively rotated to two positions, allowing a single fishing line spooler 1020 to refill a spinning reel in a first orientation and a casting reel in a second orientation. In this embodiment, the casting reel passage and the spinning reel passage are the same passage. While in the first position (FIG. 9), passage 1070 extends parallel to the fishing rod 1200 in order to refill a spinning reel and the mounting shaft 1100 is placed in the first mounting shaft orientation. While in the second position (FIG. 11), passage 1070 extends perpendicular to the fishing rod 1200 in order to refill a casting reel and the mounting shaft 1100 is placed in the second mounting shaft orientation.

The diameter of passage 1070 is slightly larger than the diameter of the mounting shaft 1100, allowing the mounting shaft 1100 to linearly extend through passage 1070. Passage 1070 may include one or more than one threads to engage the mounting shaft 1100. In another embodiment, the passage 1070 may be free of threads allowing the mounting shaft to slide linearly unimpeded. In an unimpeded configuration, the mounting shaft 1100 may be secured by a spring clip collar or fastener, such as a nut or clamp, placed around the end of mounting shaft 1100 protruding from the opening of the passage on the rear side of the spacing shaft 1060.

The mounting shaft 1100 is similar to mounting shaft 100. The applicable discussion relating to mounting shaft 100 is incorporated herein. Mounting shaft 1100 includes a top gripping end 1108 and a bottom mounting end 1109. The top gripping end 1108 optionally includes a handle 1102. Extending from the handle 1102 is a length/intermediate portion 1104. The intermediate portion 1104 is cylindrical. Further, the intermediate portion 1104 includes a length and may include helical threads along at least a portion of the length. The mounting shaft 1100 is configured to receive the supply spool 1180 along its intermediate portion 1104, the supply spool 1180 having fishing line stored thereon. The supply spool 1180 is configured to rotate around the mounting shaft 1180.

Spacing shaft 1060 and mounting shaft 1100 optionally may include a quick release mechanism as illustrated in FIG. 13. Mounting shaft 1100 may include partial helical threads or teeth 1105 extending partially around the circumference of the intermediate portion 1104. A smooth portion 1106 of the circumference has no protrusions. Passage 1070 has a single tooth 1171 or several aligned teeth. During insertion of mounting shaft 1100, the smooth portion 1006 is aligned with tooth 1171 in passage 1070 and teeth 1105 are offset from tooth 1171. This allows mounting shaft to be advanced within and retracted out of passage 1070 without rotation. After insertion to a desired position, mounting shaft is rotated less than three hundred sixty degrees to engage and lock teeth 1105 with tooth 1171 within passage 1070. The mounting shaft 1100 can be unlocked by a partial turn in the opposite direction. This design eliminates the time consuming need to rotationally turn a threaded shaft in multiple rotations to advance the mounting shaft 1100. The mounting shaft 1100 can be quickly released and easily removed for a quick change of a supply spool 1180. The mounting shaft 1100 may be injection molded plastic, metal or any combination of the two, including a plastic handle and metal shaft or a metal handle and plastic shaft.

In FIGS. 9 and 10, the fishing line spooler 1020 is used to refill spinning reel 1220. When feeding a spinning reel 1220, the supply spool 1180 is mounted with its longitudinal axis 1182 parallel to longitudinal axis 1202 of the fishing rod 1200 and parallel to a spinning reel axis 1222. The supply spool 1180 includes a hub 1184 defining a supply spool passage 1186. The mounting shaft 1100 extends through the supply spool passage 1186 and into passage 1070. Typically, at least a portion of intermediate portion 1104 will extend out of the rear side 1063 of the spacing shaft 1060.

FIGS. 11 and 12 illustrate the fishing line spooler 1020 and supply spool 1180 configured to transfer fishing line 1190 to casting reel 1210. When feeding casting reel 1210, the supply spool 1180 is mounted to the fishing line spooler 1020 with the mounting shaft 1100 oriented so that supply spool axis 1182 is perpendicular to the longitudinal axis 1202 of the rod and parallel to the casting reel axis 1212. The mounting shaft 1100 engages with the supply spool 1180 and passage 1070 in the same manner as described in reference to FIGS. 9 and 10. Fishing line 1190 from the supply spool 1180 may be fed through the line counter 1044 and to the casting reel 1210. During the refill process, a casting reel handle 1214 is cranked to pull and transfer fishing line 1190 from the supply spool 1180 to wind around the casting reel 1210.

Figure 14:
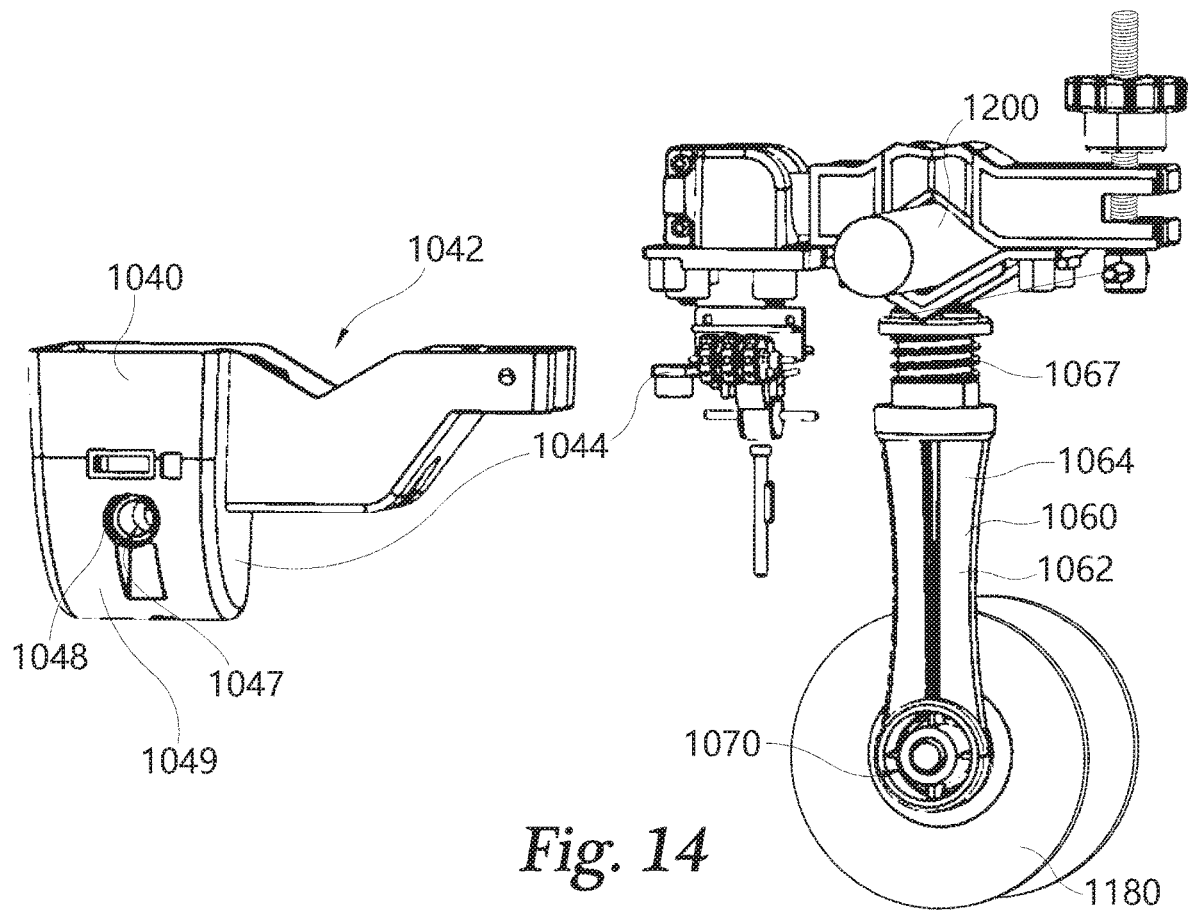
FIG. 14 is a partially exploded view of the line spooler of FIG. 9 with a clamp body removed.

FIG. 14 illustrates the fishing line spooler 1020 with the clamp body 1040 removed. As illustrated, the optional line counter 1044 may be integrated into the clamp body 1040. The line counter 1044 measures the amount of fishing line being transferred to the fishing reel, allowing the user to select a desired amount of fishing line transferred from the supply spool to the fishing rod's reel. The line counter 1044 may also function as a line guide to change the direction in which the line is fed. The line guide is offset from passage 1070. During use, the fishing line may be fed from the supply spool 1180 through an opening 1045 on a front side 1046 (see FIG. 11) through a passage 1047 of the line counter 1044 exiting from an opening 1048 on a back side 1049 of the line counter 1044 and toward the fishing rod's reel. The line counter 1044 passage 1047 extends parallel to fishing rod 1200.

Further illustrated in FIG. 14 is the spacing shaft's mechanism for rotating between the spinning reel and the casting reel orientations. In the illustrated embodiment, the proximal end 1064 of spacing shaft 1060 includes a square cross-section that matches a squared cross-sectional opening defined in the bottom of clamp body 1040. In alternative embodiments, other non-circular shapes could be used. When spacing shaft 1060 is in its upper position, the keyed interaction between the cross-sections locks together and prevents unintended rotation of the spacing shaft 1060. To rotate the shaft, the user may pull down on spacing shaft 1060 moving it to a lowered position and adding tension on spring 1067. The user may then rotate spacing shaft 1060. When spacing shaft 1060 is released, spring 1067 retracts to pull spacing shaft 1060 into the locked upper position.

Figure 15:
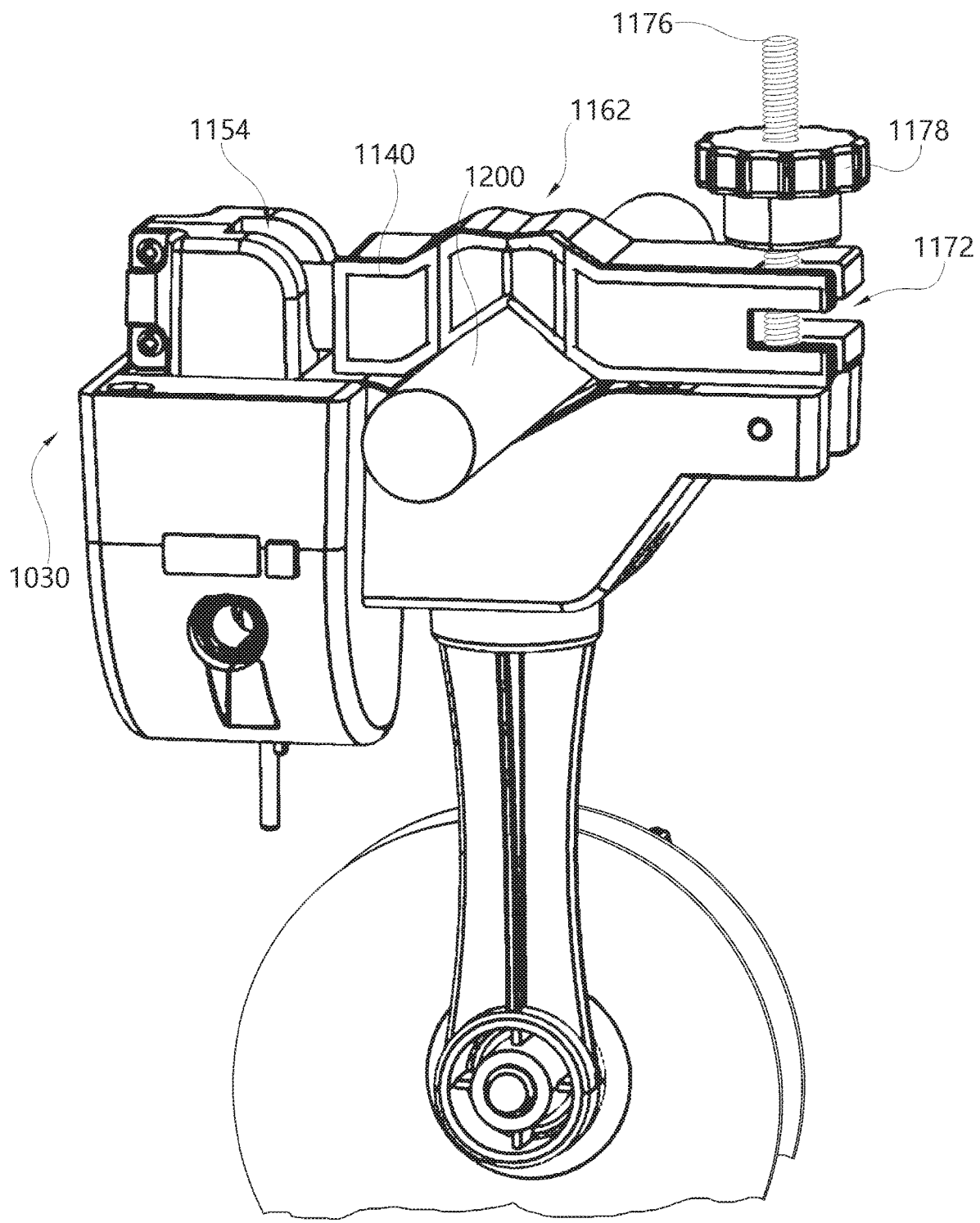
FIG. 15 is a perspective view of the line spooler of FIG. 9 with a large diameter fishing rod mounted to the line spooler.
Figure 16:
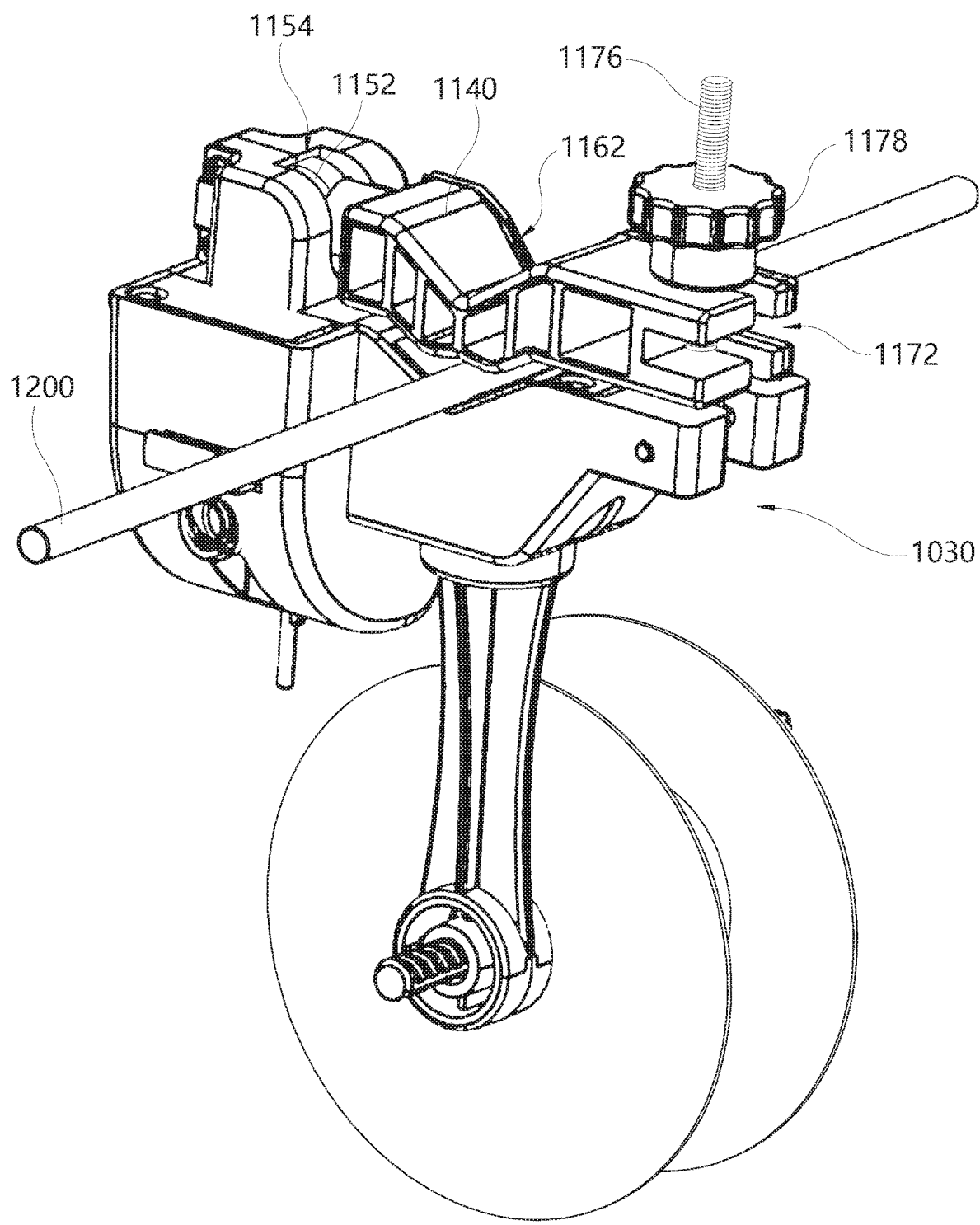
FIG. 16 is a perspective view of the line spooler of FIG. 9 with a small diameter fishing rod mounted to the line spooler.

FIG. 15 and FIG. 16 illustrate the clamp top 1140 configured to secure a fishing rod. Clamp top 1140 may include U-shaped recesses 1162 on the top side and bottom side with different depths. Clamp top 1140 may further include a ball 1152 located on the end of the clamp top 1140. Ball 1152 creates a ball joint or hinge when mounted within a socket 1154. Ball joint may be constructed of a self-lubricating durable plastic material such as Delrin®. The ball joint allows a user to rotate the clamp top 1140. Clamp top 1140 may be rotated and oriented into a concave configuration to receive larger diameter fishing rods or into a convex configuration to receive smaller diameter fishing rods.

Clamp 1030 includes a latching mechanism. The latching mechanism includes U-shaped slots 1172 on the edge of the clamp top 1140. A rotatable locking screw 1176 with a rotary knob 1178 is mounted to clamp body 1040. Locking screw 1176 may be used to lock clamp top 1140 in place. In the closed position, the locking screw 1176 is rotated into slots 1172 and then rotary knob 1178 may be rotated against clamp top 1140 to lock the clamp top 1140 in place.

The fishing line spooler 1020 is used in essentially the same manner as disclosed with fishing line spooler 20. The discussion of the method of using fishing line spooler 20 is incorporated herein.

Further disclosed is a fishing rod rack assembly which is used as a tool to hold multiple supply spools of new fishing line and multiple fishing rods. The rod rack assembly also functions as a tool to transfer fishing line to reels mounted on fishing rods.

Figure 17:
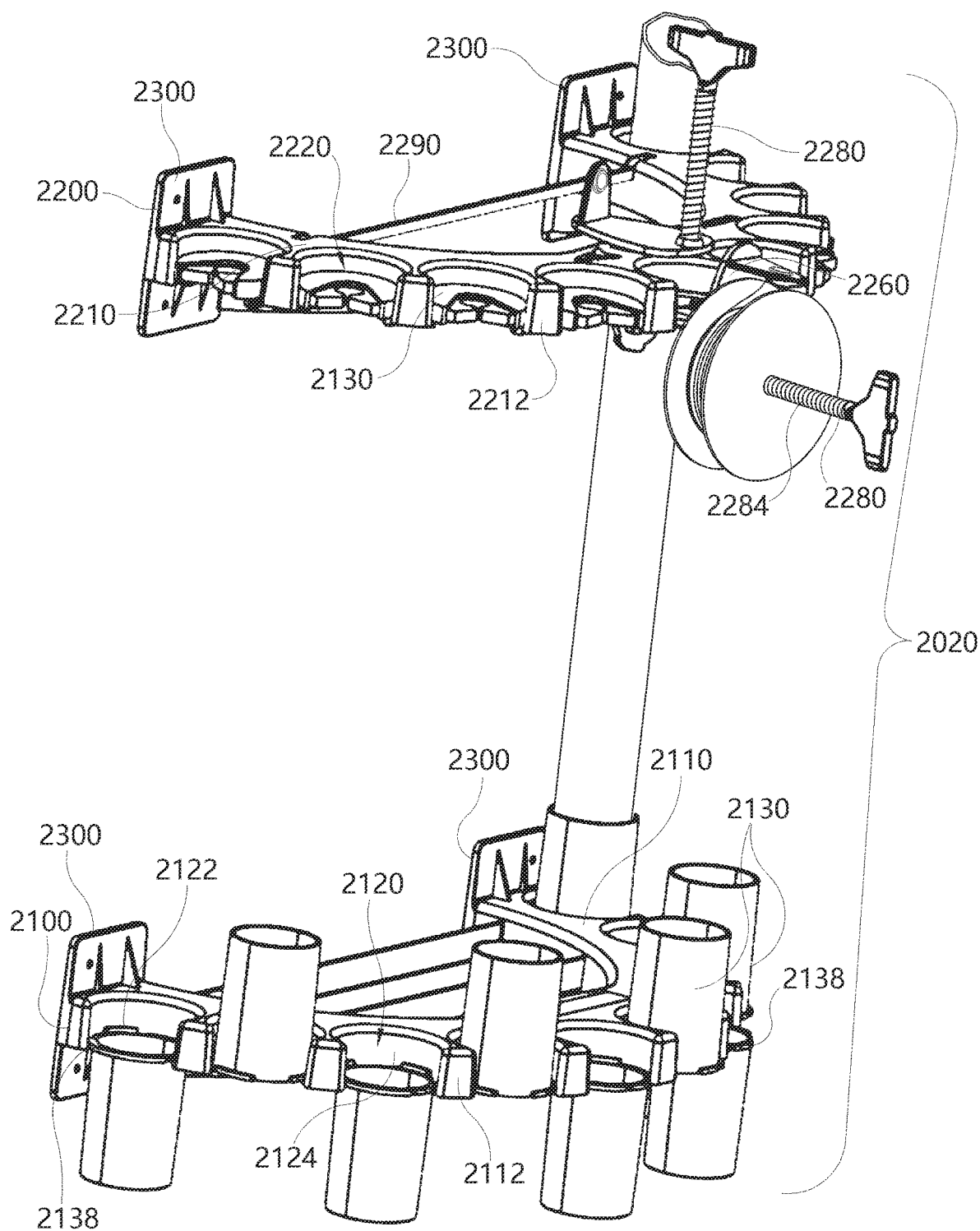
FIG. 17 is a perspective view of a representative embodiment of a rod rack assembly according to the disclosure.
Figure 18:
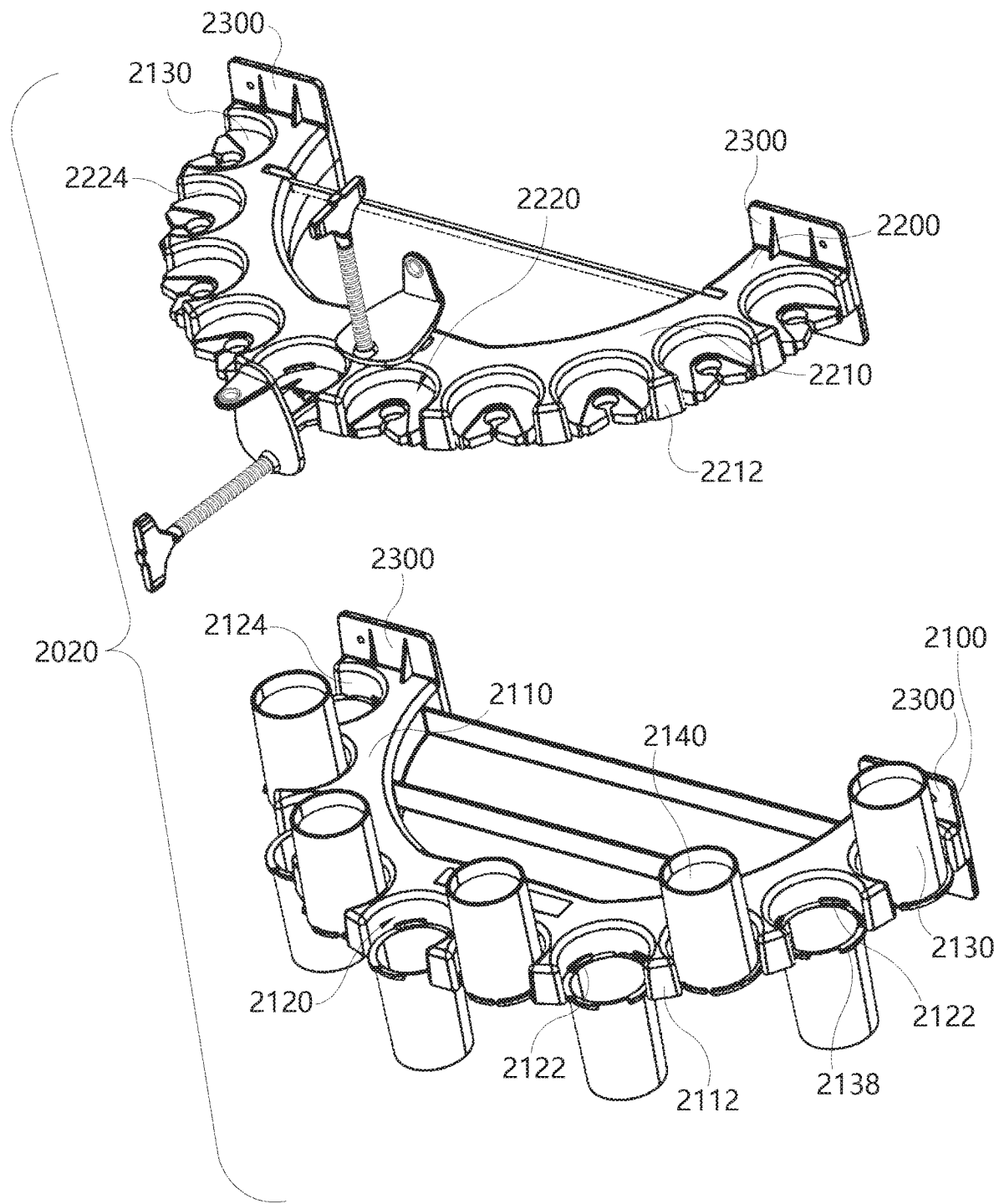
FIG. 18 is another perspective view of the rod rack assembly of FIG. 17.

FIGS. 17 and 18 illustrate a rod rack assembly 2020 in perspective views. Rod rack assembly 2020 includes a lower bracket 2100 and an upper bracket 2200. Both brackets 2100 and 2200 include mounts 2300 to mount the rod rack assembly 2020 to a structure, for example a wall. When mounted the brackets 2100 and 2200 are appropriately aligned and spaced apart. Brackets 2100 and 2200 are composed of any appropriate material, for example metal, plastic or a combination of the two.

Lower bracket 2100 includes a bracket body 2110, for example bracket body 2110 may be arcuately shaped. Body 2110 includes a series of cavities 2120 around an outer edge 2112 of the bracket body 2110. The cavities 2120 may be circular with an open side on the outer edge 2112 of the bracket body 2110. In the illustrated embodiment, the lower bracket 2100 includes ten cavities 2120. In other embodiments, the lower bracket 2100 may include fewer than ten cavities or more than ten cavities. Cavities 2120 include keyed protrusions 2122 on an interior surface 2124 of the cavity 2120.

Figure 19:
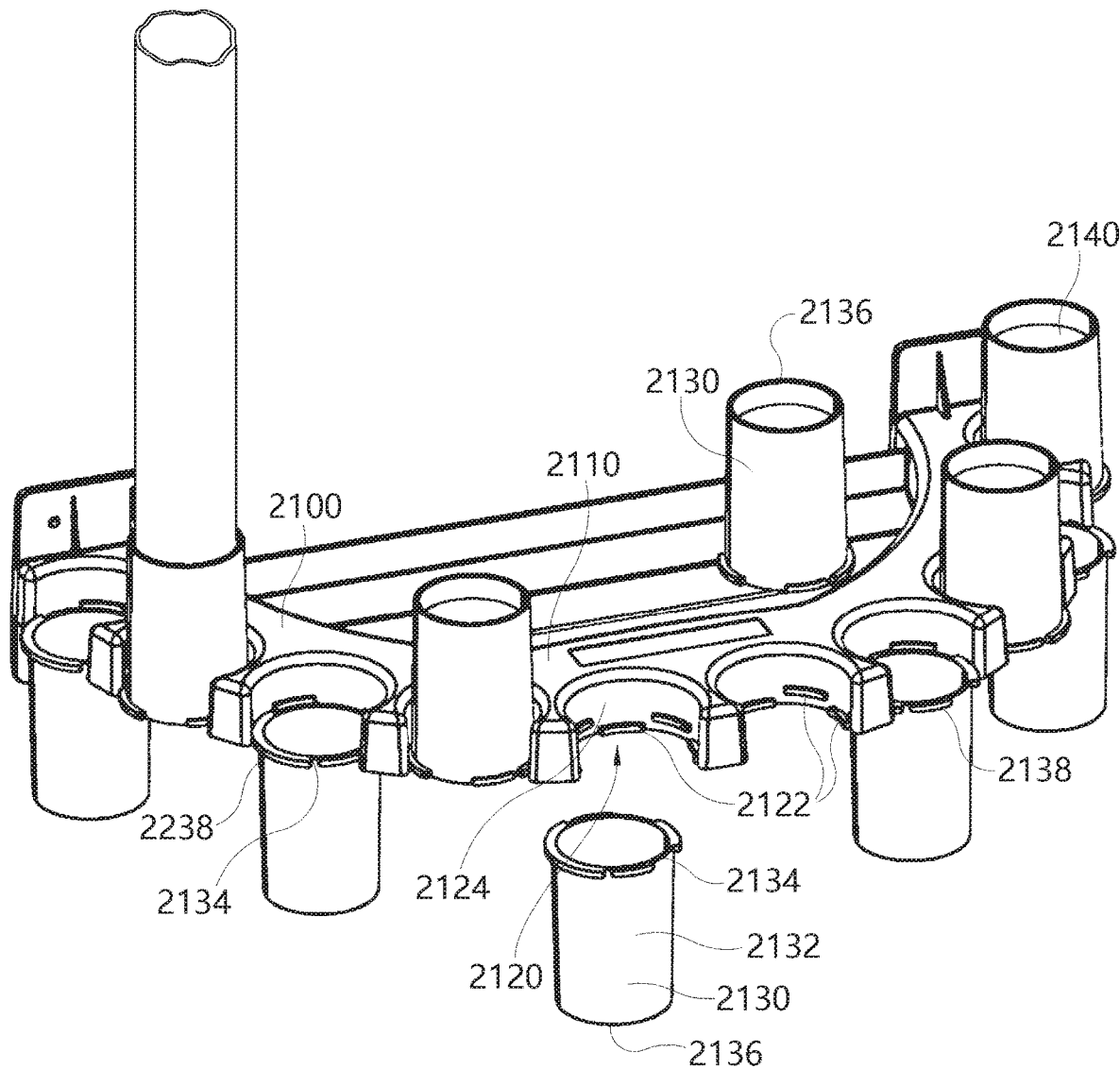
FIG. 19 is a partially exploded, perspective view of a lower bracket of the rod rack assembly of FIG. 17.

As further illustrated in FIG. 19, lower bracket 2100 includes a plurality of cups 2130. Cups 2130 include a peripheral side wall 2132 with an upper edge 2134 and a lower edge 2136. The side wall 2132 and edges 2134 and 2136 may be configured into a cylinder. Cups 2130 further include a bottom floor 2140. Bottom floor 2140 is circular.

Bottom floor 2140 is disposed within the peripheral side wall 2132 at any position between the upper circular edge 2134 and the lower circular edge 2136. Bottom floor 2140 may be offset from one end more than the other. Upper edge 2134 includes a series of tabs 2138 extending perpendicular from the upper edge 2134 of the cup 2130.

Upper edge 2134 of cup 2130 is placed into cavity 2120 with tabs 2138 offset from the keyed protrusions 2122. Next, the cup 2130 is rotated and locked into place by the interaction between tabs 2138 and protrusions 2122. The cups 2130 may be placed with the upper edge 2134 face up or face down, allowing the cups to extend in two different directions. While in the face up position, the cup 2130 extends below the bottom of lower bracket 2100. While in the face down position, the cup 2130 extends above the lower bracket 2100. When in use, a fishing rod's butt rests on the bottom floor 2140. These various configurations allow fishing rods to rest in the cups 2130 at different heights while appropriately interacting with the upper bracket 2200, for example offsetting the heights of adjacent reels when multiple fishing rods are stored on rod rack assembly 2020.

Figure 20:
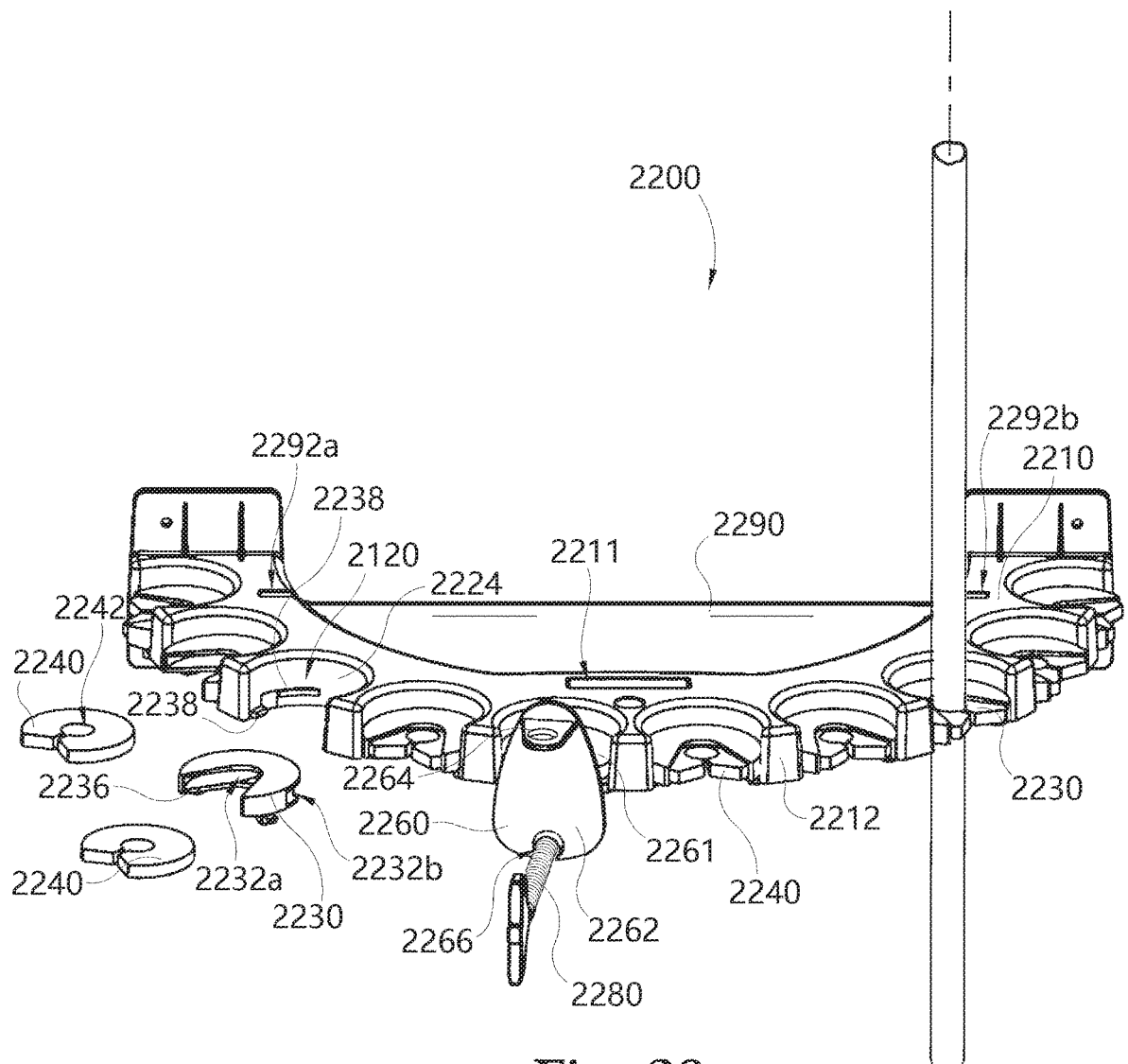
FIG. 20 is a partially exploded, perspective view of an upper bracket of the rod rack assembly of FIG. 17.

Upper bracket 2200 is illustrated in detail in FIG. 20. Upper bracket 2200 includes a bracket body 2210 matching the shape of lower bracket body 2110. Body 2210 includes cavities 2220 around an outer edge 2212 of the bracket body 2210. The cavities 2220 may be circular with an open side on the outer edge 2212 of the bracket body 2210. In the illustrated embodiment, the upper bracket 2200 includes ten cavities to match the lower bracket 2100. In other embodiments, the upper bracket 2200 may include fewer than ten cavities or more than ten cavities. Cavities may include keyed protrusions 2238 on an interior surface 2224 of the cavity 2220.

Upper bracket 2200 further includes a plurality of receivers 2230. Receivers 2230 may be the same shape as the cavities 2220. Receivers 2230 are slightly smaller than cavities 2220 allowing each receiver 2230 to be nested within a cavity 2220. Each receiver 2230 defines an opening 2232*a* on a front side to introduce a fishing rod. Receivers 2230 include one or more slots 2232*b* on a back side of receiver 2230 and flanges 2234 on a bottom side 2236 of the cavity body. The flanges 2234 and slots 2232*b* engage with keyed protrusions 2238 in cavity 2220. The receiver 2230 is inserted into cavity 2220 and rotated to lock with the keyed protrusions 2238 on the interior surface 2224 of cavity 2220.

Receivers 2230 further include C-shaped holders 2240 to resiliently hold a fishing rod shaft. Each holder 2240 defines an interior opening 2242 allowing a fishing rod to be laterally introduced and held by the holder 2240. The holders 2240 may be made of any appropriate material, for example a resilient rubber or plastic.

A spinning reel spool holder 2260 may optionally be used with upper bracket 2200. Spool holder 2260 includes a vertically extending body 2262 with a guide tab 2264 extending perpendicularly from an upper portion of the body. Body 2262 further includes a passage 2266 extending through the body 2262.

Spinning reel spool holder 2260 includes a receiving portion 2261 on the back of body 2262. When the spinning reel spool holder 2260 is used, a holder 2240 is removed from a cavity 2220. The receiving portion 2261 is slid into cavity 2220 and rotated to secure spinning reel spool holder 2260 within cavity 2220. When the spinning reel spool holder 2260 is not in use, the entire spinning reel spool holder 2260 may be stored with receiving portion 2261 vertically nested within a slot 2211 on body 2210.

Mounting shaft 2280 may be any of the mounting shafts previously disclosed, including mounting shaft 100 or mounting shaft 1100. Therefore, the prior disclosure is incorporated herein. As seen in FIG. 20, mounting shaft can be used to secure a supply spool to passage 2262 of the spinning reel spool holder 2260. Rod rack assembly may use the same quick release features described in the disclosure above, all applicable disclosure is incorporated herein.

When the rod rack assembly 2020 is used to refill a spinning reel, a user secures the supply reel spool holder to upper bracket 2200 and feeds fishing line in a method comparable to the methods described above.

Upper bracket 2200 includes a storage rod 2290 for refilling a casting reel and storing supply spools with the rod rack assembly 2020. In some embodiments, storage rod 2290 is made of steel. Storage rod 2290 is secured within and extend between two slots 2292*a* and 2292*b* in the upper bracket 2200 (see FIG. 20). In some embodiments, both ends of the storage rod 2290 may be removable from the slots 2292*a* and 2292*b*. In alternative embodiments, one end of the storage rod 2290 is permanently fixed inside either slot 2292*a* or slot 2292*b* allowing the other end of storage rod 2290 to hinge upward to slide supply spools linearly onto the storage rod 2290 and back down to securely store extra supply spools. When feeding a casting reel, line may be fed directly from the supply spool on storage rod 2290 to the casting reel.

The language describing the sides, surfaces and tops and bottoms of the disclosed components is not intended to be limiting in any manner. The language is solely included to aid in the understanding of the disclosure.

While the disclosure has been illustrated and described in detail in the drawings and foregoing description, the same is to be considered as illustrative and not restrictive in character, it being understood that only the preferred embodiment has been shown and described and that all changes, equivalents, and modifications that come within the spirit of the disclosure defined by the following claims are desired to be protected.

The invention claimed is:

1. A fishing line spooler, comprising:
a clamp selectively securable to a fishing rod shaft having a longitudinal axis; and
a mounting shaft having a length and longitudinal axis;
wherein the mounting shaft is configured to receive a supply spool along its length, the supply spool having fishing line stored thereon, and wherein the supply spool is configured to rotate around the mounting shaft;
wherein the mounting shaft is selectively securable to the clamp in a first orientation with a supply spool thereon, wherein in the first orientation the longitudinal axis of the mounting shaft is parallel to the longitudinal axis of the fishing rod shaft;
wherein the mounting shaft is selectively securable to the clamp in a second orientation with a supply spool mounted thereon, wherein in the second orientation the longitudinal axis of the mounting shaft is perpendicular to the longitudinal axis of the fishing rod shaft;
wherein the fishing line spooler is configured to refill a fishing line on a spinning reel on the fishing rod shaft in the first orientation of the mounting shaft;
wherein the fishing line spooler is configured to refill a fishing line on a casting reel on the fishing rod shaft in the second orientation of the mounting shaft; and
wherein the clamp defines at least two transverse passages having different diameters so that the clamp is selectively securable to fishing rod shafts of different diameters.

2. The fishing line spooler of claim 1, comprising:
a tensioning element configured to extend around a fishing line on the supply spool;
wherein the tensioning element is an elastic band; and
wherein the tensioning element is arranged so that the fishing line extends through an opening defined by the tensioning element as the fishing line leaves the supply spool.

3. The fishing line spooler of claim 1, wherein the clamp includes a line guide, and wherein a fishing line stored on the supply spool and being fed to the fishing reel is directed through the line guide to change the direction of the fishing line between the supply spool and the fishing rod reel.

4. The fishing line spooler of claim 3, wherein the line guide is a line counter.

5. The fishing line spooler of claim 1, wherein the clamp includes a first clamp half and a second clamp half hinged to be selectively movable between an open position and a closed position, and wherein the fishing rod shaft is securable between the first clamp half and the second clamp half in the closed position.

6. The fishing line spooler of claim 5, wherein the clamp defines a spinning reel passage which the mounting shaft extends through in the first orientation and a casting reel passage which the mounting shaft extends through in the second orientation, and wherein the casting reel passage is different from the spinning reel passage.

7. The fishing line spooler of claim 6, wherein a sliding lever selectively holds the mounting shaft in the casting reel passage.

8. The fishing line spooler of claim 7, wherein the sliding lever includes a forked plate with a forked portion configured to engage an intermediate portion of the mounting shaft to selectively hold the mounting shaft in place.

9. The fishing line spooler of claim 1, wherein the clamp includes a top end defining an opening with an orientation different from the first orientation and the second orientation, and wherein the mounting shaft may be placed through the opening so that a majority of the length of the mounting shaft is stored within an interior volume of the clamp.

10. The fishing line spooler of claim 1, wherein the clamp comprises a clamp body and a spacing shaft, wherein the spacing shaft has a proximal end secured to the clamp body and a distal end spaced away from the clamp body, and wherein the spacing shaft defines a spacing shaft passage through the distal end of the spacing shaft;
wherein the first orientation of the mounting shaft is with the mounting shaft extending through the spacing shaft passage with the spacing shaft in a first position; and
wherein the second orientation of the mounting shaft is with the mounting shaft extending through the spacing shaft passage with the spacing shaft in a second position.

11. The fishing line spooler of claim 10, wherein the spacing shaft is selectively rotatable between a first position which places the mounting shaft in the first mounting shaft orientation and a second position which places the mounting shaft in the second mounting shaft orientation.

12. A method comprising:
securing a clamp of a fishing line spooler to a fishing rod having a longitudinal axis, wherein the clamp defines a transverse passage extending from a front side of the clamp to a rear side of the clamp for receiving the fishing rod;

placing a supply spool with fishing line stored thereon on a mounting shaft, wherein the supply spool is rotatable around the mounting shaft, wherein the mounting shaft is securable to the clamp in a first orientation parallel to the longitudinal axis of the fishing rod, and wherein the mounting shaft is securable to the clamp in a second orientation perpendicular to the longitudinal axis of the fishing rod;

placing a tensioning element around a fishing line on the supply spool, wherein the tensioning element is an elastic band having an opening;

feeding the fishing line on the supply spool through the opening as the fishing line leaves the supply spool and extends toward a fishing rod reel; and refilling a fishing line on a spinning reel on the fishing rod while the mounting shaft is in the first orientation or refilling a fishing line on a casting reel on the fishing rod while the mounting shaft is in the second orientation.

13. A fishing line spooler, comprising:
a clamp including a first clamp half and a second clamp half hinged to be selectively movable between an open position or a closed position wherein in the closed position the clamp is configured to engage a fishing rod shaft with a longitudinal axis;
a spinning reel passage extending through the clamp;
a casting reel passage extending through the clamp; and
a mounting shaft;
wherein the spinning reel passage and the casting reel passage have perpendicular axes;
wherein the mounting shaft, with a supply spool mounted thereon, is selectively mountable in a first orientation extending through the casting reel passage; and
wherein the mounting shaft, with a supply spool of fishing line stored thereon, is selectively mountable in a second orientation extending through the spinning reel passage.

14. The fishing line spooler of claim 13, wherein the clamp includes a line guide, and wherein in at least one orientation a fishing line stored on the supply spool travels from the supply spool through the line guide to change the direction of the fishing line as the fishing line is fed from the supply spool to a reel on the fishing rod.

15. The fishing line spooler of claim 14, wherein the line guide is a line counter.

16. The fishing line spooler of claim 13, wherein the casting reel passage is different from the spinning reel passage.

17. The fishing line spooler of claim 13, wherein the clamp comprises a clamp body and a spacing shaft, wherein the spacing shaft has a proximal end secured to the clamp body and a distal end spaced away from the clamp body, and wherein the spacing shaft defines a spacing shaft passage through the distal end of the spacing shaft;

wherein the first orientation of the mounting shaft is with the mounting shaft extending through the spacing shaft passage with the spacing shaft in a first position; and wherein the second orientation of the mounting shaft is with the mounting shaft extending through the spacing shaft passage with the spacing shaft in a second position.

18. A fishing line spooler, comprising:
a clamp selectively securable to a fishing rod shaft having a longitudinal axis; and
a mounting shaft having a length and longitudinal axis;
wherein the mounting shaft is configured to receive a supply spool along its length, the supply spool having fishing line stored thereon, and wherein the supply spool is configured to rotate around the mounting shaft;
wherein the mounting shaft is selectively securable to the clamp in a first orientation with a supply spool thereon, wherein in the first orientation the longitudinal axis of the mounting shaft is parallel to the longitudinal axis of the fishing rod shaft;
wherein the mounting shaft is selectively securable to the clamp in a second orientation with a supply spool mounted thereon, wherein in the second orientation the longitudinal axis of the mounting shaft is perpendicular to the longitudinal axis of the fishing rod shaft;
wherein the fishing line spooler is configured to refill a fishing line on a spinning reel on the fishing rod shaft in the first orientation of the mounting shaft;
wherein the fishing line spooler is configured to refill a fishing line on a casting reel on the fishing rod shaft in the second orientation of the mounting shaft; and
wherein the clamp includes a clamp body and a clamp top, wherein the clamp top is selectively rotatable into a concave configuration to receive larger diameter fishing rods or a convex configuration to receive smaller diameter fishing rods.

19. The fishing line spooler of claim 18, comprising:
a tensioning element configured to extend around a fishing line on the supply spool;
wherein the tensioning element is an elastic band; and
wherein the tensioning element is arranged so that the fishing line extends through an opening defined by the tensioning element as the fishing line leaves the supply spool.

20. The fishing line spooler of claim 18, wherein the clamp includes a line guide, and wherein a fishing line stored on the supply spool and being fed to the fishing reel is directed through the line guide to change the direction of the fishing line between the supply spool and the fishing rod reel.

* * * * *